(12) United States Patent
Tsai et al.

(10) Patent No.: US 11,017,148 B2
(45) Date of Patent: *May 25, 2021

(54) MULTI-PATTERNING GRAPH REDUCTION AND CHECKING FLOW METHOD

(71) Applicant: Taiwan Semiconductor Manufacturing Co., Ltd., Hsin-Chu (TW)

(72) Inventors: Nien-Yu Tsai, Taichung (TW); Chin-Chang Hsu, Banqiao (TW); Wen-Ju Preet Yang, Hsinchu (TW); Hsien-Hsin Sean Lee, Duluth, GA (US)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/587,700

(22) Filed: Sep. 30, 2019

(65) Prior Publication Data

US 2020/0167519 A1  May 28, 2020

Related U.S. Application Data

(63) Continuation of application No. 15/255,489, filed on Sep. 2, 2016, now Pat. No. 10,430,544.

(51) Int. Cl.
*G06F 30/30* (2020.01)
*G06F 30/398* (2020.01)
(Continued)

(52) U.S. Cl.
CPC .............. *G06F 30/398* (2020.01); *G03F 1/36* (2013.01); *G06F 2119/18* (2020.01); *Y02P 90/02* (2015.11)

(58) Field of Classification Search
CPC ...... G06F 30/398; G06F 2119/18; G03F 1/36; Y02P 90/265
(Continued)

(56) References Cited

U.S. PATENT DOCUMENTS 8,601,416 B2   12/2013   Kuo et al.
8,689,151 B1 *  4/2014   Agarwal ............ G03F 7/70466
                                                716/50
(Continued)

*Primary Examiner* — Jack Chiang
*Assistant Examiner* — Brandon Bowers
(74) *Attorney, Agent, or Firm* — Duane Morris LLP

(57) ABSTRACT

A method of generating a plurality of photomasks includes generating a circuit graph. The circuit graph comprises a plurality of vertices and a plurality of edges. Each of the plurality of vertices is representative of one of a plurality of conductive lines. The plurality of edges are representative of a spacing between the conductive lines less than an acceptable minimum distance. $K_{n+1}$ graph comprising a first set of vertices selected from the plurality of vertices connected in series by a first set of edges selected from the plurality of edges and having at least one non-series edge connection between a first vertex and a second vertex selected from the first set of vertices is reduced by merging a third vertex into a fourth vertex selected from the first set of the plurality of vertices. An n-pattern conflict check is performed and the photomasks generated based on the result.

20 Claims, 17 Drawing Sheets

(51) Int. Cl.
  *G03F 1/36* (2012.01)
  *G06F 119/18* (2020.01)
(58) Field of Classification Search
  USPC .......................................................... 716/55
  See application file for complete search history.

(56) References Cited

U.S. PATENT DOCUMENTS

| | | |
|---|---|---|
| 8,762,900 B2 | 6/2014 | Shin et al. |
| 8,775,993 B2 | 7/2014 | Huang et al. |
| 8,887,116 B2 | 11/2014 | Ho et al. |
| 8,943,445 B2 | 1/2015 | Chen et al. |
| 8,990,762 B2 | 3/2015 | Yuh et al. |
| 9,081,933 B2 | 7/2015 | Liu et al. |
| 9,183,341 B2 | 11/2015 | Chen et al. |
| 9,213,790 B2 | 12/2015 | Hsu et al. |
| 2011/0197168 A1* | 8/2011 | Chen ............... G06F 30/398 716/50 |
| 2014/0237435 A1 | 8/2014 | Chen et al. |
| 2014/0282293 A1* | 9/2014 | Lin ............... G06F 30/398 716/52 |
| 2014/0304670 A1 | 10/2014 | Su et al. |
| 2015/0278419 A1 | 10/2015 | Yang et al. |
| 2015/0370937 A1 | 12/2015 | Liu et al. |
| 2015/0370945 A1 | 12/2015 | Lee |

\* cited by examiner

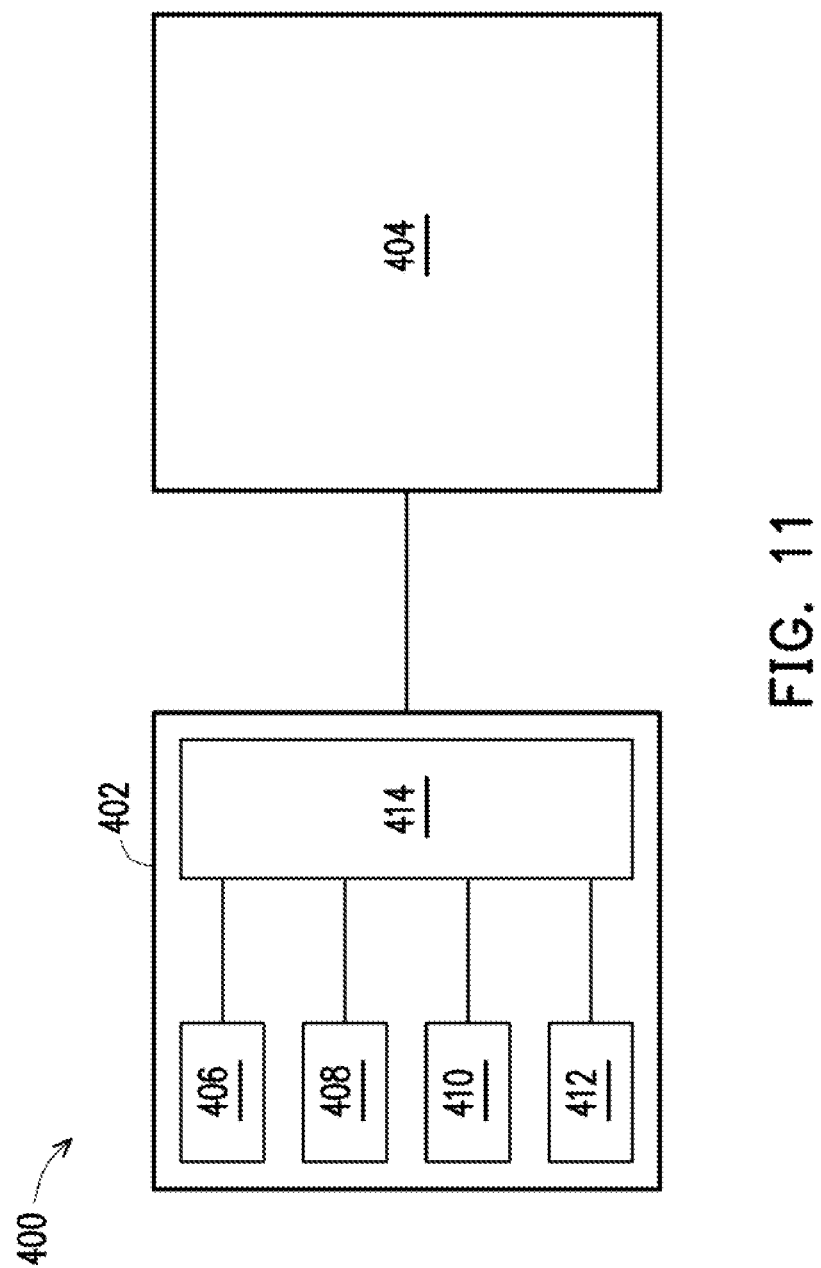

MULTI-PATTERNING GRAPH REDUCTION AND CHECKING FLOW METHOD

CROSS-REFERENCE TO RELATED APPLICATIONS

This application is a continuation of U.S. patent application Ser. No. 15/255,489, filed Sep. 2, 2016, and entitled "Multi-Patterning Graph Reduction and Checking Flow Method," the disclosure of which is incorporated herein by reference in its entirety.

FIELD

This disclosure relates to semiconductor fabrication generally, and more specifically to multi-patterning semiconductor mask checking.

BACKGROUND

In semiconductor integrated circuit (IC) fabrication processes, the resolution of a photoresist pattern begins to blur at about 45 nanometer (nm) half pitch. To continue to use fabrication equipment purchased for larger technology nodes, multiple patterning methods have been developed.

Multiple patterning technology (MPT) involves forming patterns on a single layer over a substrate using two or more different masks in succession. As long as the patterns within each individual mask comply with the relevant minimum separation distances for the technology node, the combination of patterns formed using the plural masks may include smaller spacings than the minimum separation distance design rule. Thus, MPT provides flexibility and generally allows for significant reduction in overall IC layout.

MPT is a layout splitting method analogous to an M-coloring problem for layout splitting in graph theory, where M is the number of masks used to expose a single layer (and the number of exposures). For example, if two masks are to be used (double patterning technology, DPT), it is customary to refer to the patterns as being assigned one of two "color types", where the color corresponds to a photomask assignment.

Some multi-patterning methods, such as the litho-etch-litho-etch (LELE) method use plural reticles in succession for patterning a single layer. Other multi-patterning methods, such as the self-aligned double patterning (SADP) method, use one reticle as a first mask to pattern a resist, and then form spacers adjacent those patterns, and use the spacers as a hard mask for further etching.

BRIEF DESCRIPTION OF THE DRAWINGS

Aspects of the present disclosure are best understood from the following detailed description when read with the accompanying figures. It is noted that, in accordance with the standard practice in the industry, various features are not necessarily drawn to scale. In fact, the dimensions of the various features may be arbitrarily increased or reduced for clarity of discussion.

FIG. 11 illustrates a system 400 for generating a plurality of photomasks according to one or more the methods disclosed herein, in accordance with some embodiments.

DETAILED DESCRIPTION

Figure 1A:
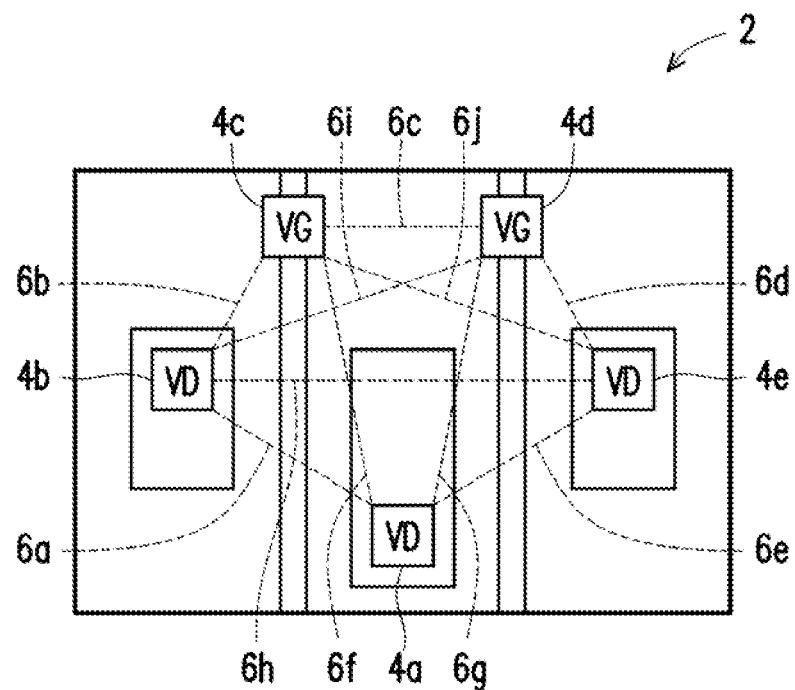
FIG. 1A illustrates a circuit layout including a plurality of conductive lines, in accordance with some embodiments.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

As used herein, the term "first mask" or "mask A" refers to a photomask (reticle) used in a photolithography process to expose a photoresist in a single layer over the substrate and the terms "second mask" or "mask B," "third mask" or "mask C," "fourth mask" or "mask D," etc., can refer to additional photomasks (or hard mask) used to pattern the same layer as the first mask (referred to herein collectively as "the masks" or "plurality of masks"). The masks are used to pattern sets of polygons (circuit patterns, such as conductive lines) in the same layer over the substrate, with each mask corresponding to a separate set of polygons. For example, three separate sets of patterns such as conductive lines are denoted as A, B, and C respectively. The additional masks are used to pattern additional groups of lines (or other polygons) using a process that can be the same and/or different from the process used to pattern a first group of lines using the first mask.

As used herein, the term "color" or "graph color" is used to refer to one or more polygons (e.g., circuit patterns) selected for inclusion on one of the plurality of masks.

Graph coloring is a special case of graph labeling that assigns "colors" to elements of a graph subject to constraints, for example, polygons that cannot be included on the same photomask. In some embodiments, vertices are colored. Vertex coloring, or proper vertex coloring, includes assignment of colors to vertices within a graph such that no two vertices sharing the same edge have the same color. In some embodiments, each of the polygons in a circuit layout are considered a vertex within a graph and can be assigned a color. For example, a "first color" can refer to one or more polygons selected for inclusion on a first mask, a "second color" can refer to one or more polygons selected for inclusion on a second mask, a "third color" can refer to one or more polygons selected for inclusion on a third mask, etc. In some embodiments, edges between the vertices can be colored. As used herein, the term "coloring check" can be used to refer to a process of checking compatibility of a graph with a selected coloring process and/or the process of coloring a graph according to a selected coloring scheme.

As used herein, the notation $K_n$ is used to refer to one or more graphs having a predetermined number of vertices n connected by a plurality of edges to define an outer perimeter shape. For example, the notation $K_3$ refers to a graph having three vertices each connected by a perimeter edge to define a triangular (or three-sided) shape, the notation $K_4$ refers to a graph having four vertices each connected by a perimeter edge to define a four-sided shape (such as a square, kite, non-regular four-sided shape, etc.), $K_5$ refers to a graph having five vertices each connected by a perimeter edge to define a five-sided shape, etc. Further, as used herein, the notation $K_{n-1}$ reduction is used to denote the reduction of a $K_n$ graph to a $K_{(n-1)}$ graph by removing one of the vertices from the $K_n$ graph. For example, the notation $K_{4-1}$ reduction refers to a reduction process of removing a first vertex from a $K_4$ graph (i.e., a graph having four vertices each connected by a perimeter edge to define a four-sided shape) to form a $K_3$ graph.

Figure 1B:
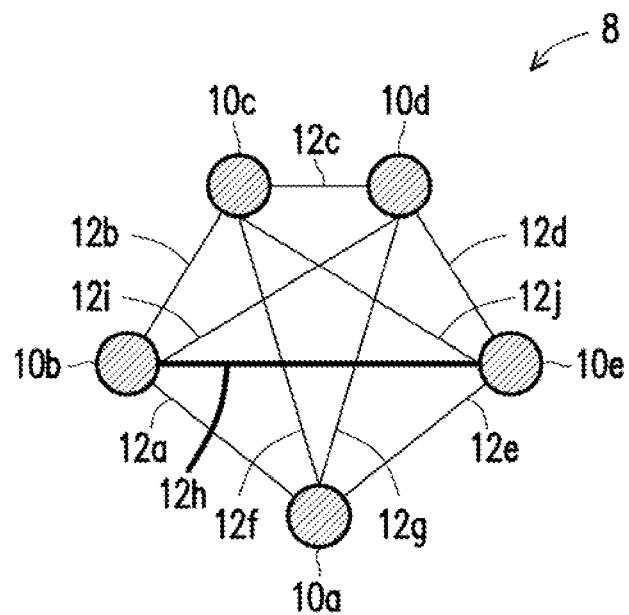
FIG. 1B illustrates a graph-representation of the circuit layout of FIG. 1A, in accordance with some embodiments.

FIG. 1A illustrates one embodiment of a semiconductor circuit layout 2 including a plurality of conductive lines (or traces) 4a-4e. The conductive lines 4a-4e correspond to one or more semiconductor elements, such as, power lines, bit lines, word lines, gates, and/or any other suitable semiconductor element. For example, in the illustrated embodiment, a first conductive line 4a, a second conductive line 4b, and a fifth conductive line 4e are connected to first voltage (VD) and a third conductive line 4c and a fourth conductive line 4d are connected to a second voltage (VG). The conductive lines 4a-4e are arranged in a predetermined layout with each of the conductive lines 4a-4e having a spacing 6a-6j therebetween. The spacing lines 6a-6j are shown in phantom as they are added purely for illustrative purposes and are not part of the circuit layout 2. The circuit layout 2 can be represented as a graph 8 as shown in FIG. 1B. The conductive lines 4a-4e are each represented as a vertex 10a-10e in the graph 8. If the distance 6a-6j between a first conductive line 4a-4e and a second conductive line 4a-4e is less than a predetermined distance, an edge 12a-12j is added between the vertices 10a-10e in the graph 8.

For example, as shown in FIG. 1A, spacing 6a, 6e-6g between the first conductive line 4a and each of a second conductive line 4b, a third conductive line 4c, a fourth conductive line 4d, and a fifth conductive line 4e is less than a predetermined minimum spacing. Edges 12a, 12e-12g are added to the graph 8 to connect the first vertex 10a and each of the second vertex 10b, the third vertex 10c, the fourth vertex 10d, and the fifth vertex 10e respectively. Similarly, spacing 6a-6b, 6h-6i between the second conductive line 4b and each of the first conductive line 4a, the third conductive line 4c, the fourth conductive line 4d, and the fifth conductive line 4e are less than predetermined minimum spacing. Edges 12a-12b, 12h-12i are added to the graph 8 to connect the second vertex 10b to each the first vertex 10a, the third vertex 10c, the fourth vertex 10d, and the fifth vertex 10e. The third vertex 10c, the fourth vertex 10d, and the fifth vertex 10e each include edges 12a-12j connecting the vertices 10c-10e to each of the other vertices 10a-10e, representing a spacing less than the predetermined minimum spacing between each of the conductive lines 4a-4e in the circuit layout 2. In some embodiments, a length of the edge 12a-12j corresponds to the distance between the connected vertices 10a-10e.

In some embodiments, each of the vertices 10a-10e are assigned a "color" corresponding to the inclusion of the associated conductive line 4a-4e on a photomask during a photolithographic process of forming the circuit layout 2 on a semiconductor substrate. For example, in embodiments corresponding to a three-photomask process, each of the vertices 10a-10e are assigned one of three selected colors, while in a four-photomask process, each of the vertices 10a-10e are assigned one of four selected colors. FIG. 1B illustrates the graph 8 having a four-color coloring. Although the term "color" is used herein, it will be appreciated that each of the vertices 10a-10e (and corresponding conductive lines 4a-4e) can be assigned using any suitable categories indicative of inclusion on a photomask and are not limited to the use of colors. For example, in various embodiments, the "colors" can include letter groups, number groups, word groups, color groups, and/or any other suitable grouping corresponding to the number of photomasks used during a photolithographic process. In FIG. 1B, the colors are represented by various line patterns. For example, the first vertex 10a is assigned a first color, the second vertex 10b and the fifth vertex 10e are both assigned a second color, the third vertex 10c is assigned a third color, and the fourth vertex 10d is assigned a fourth color.

In order to convert the circuit layout 2 into a plurality of photomasks corresponding to a photolithographic process, each of the vertices 10a-10e must be assigned a color such that no two connected vertices 10a-10e (i.e., no two vertices 10a-10e having an edge 12 therebetween) share the same color. A color selected from a predetermined number N of colors is assigned to each of the vertices 10a-10e. The predetermined number N is equal to the number of photomasks used in a photolithographic process and each of the colors corresponds to one of the photomasks. For example, if a triple patterning photolithographic process is used, the predetermined number of colors is 3 (N=3).

If each of the vertices 10a-10e can be assigned one of the predetermined M colors such that no two connected vertices 10a-10e share a color, the circuit layout 2 is compatible with a photolithographic process using M or fewer photomasks. If two vertices 10a-10e are connected by an edge and share a color, a conflict is exists within the graph 8 and the circuit layout 2 is not compatible with a photolithographic process using M or fewer photomasks. For example, as shown in FIG. 1B, the graph 8 representative of the circuit layout 2 has an edge 12h connecting a second vertex 10b and a fifth vertex 10e that have the same color. The graph 8 is not four-color colorable, and therefore is not compatible with photolithographic processes using four or fewer photomasks. Circuit layouts 2 having conflicts must be redesigned to remove the conflicts and/or be assigned to a photolithographic process having a greater number of photomasks.

In some embodiments, a graph 8 is checked for compatibility with a N-photomask photolithographic process prior to producing photomasks for the photolithographic process. The coloring check can be performed using any suitable coloring process, such as, for example, a brute-force coloring process, a heuristic coloring process, a deterministic rules-based process, and/or any other suitable coloring process utilized in graph theory. In some embodiments, a multi-patterning checking flow can be applied prior to performing the coloring process to reduce the complexity of color patterning for multi-patterning (i.e., multiple photomask) circuit layouts.

Figure 2:
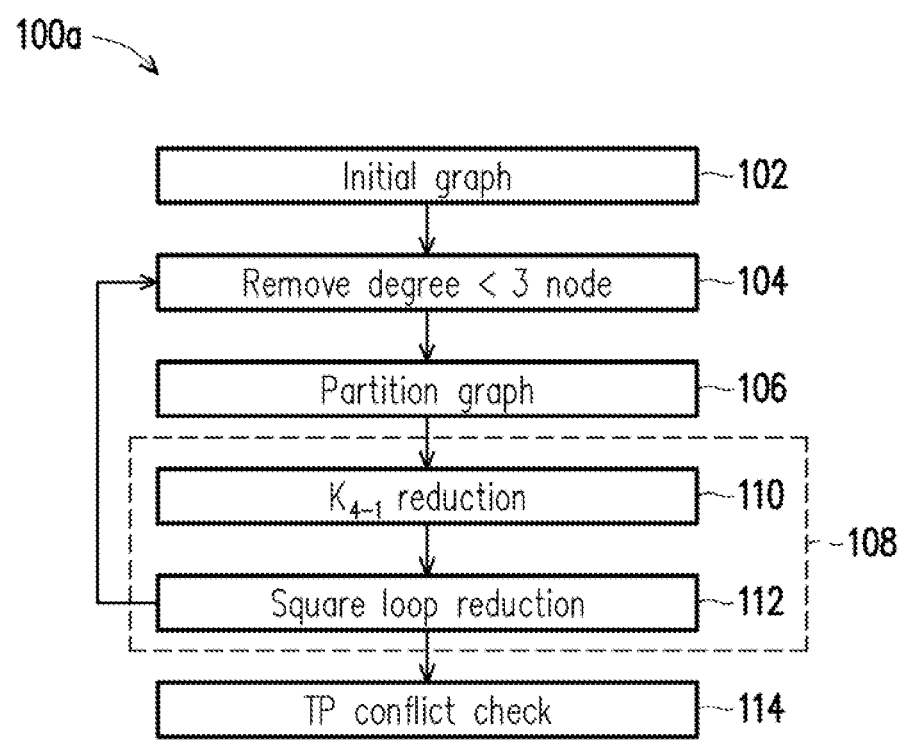
FIG. 2 is a flow chart illustrating a triple patterning checking method, in accordance with some embodiments.
Figure 3A:
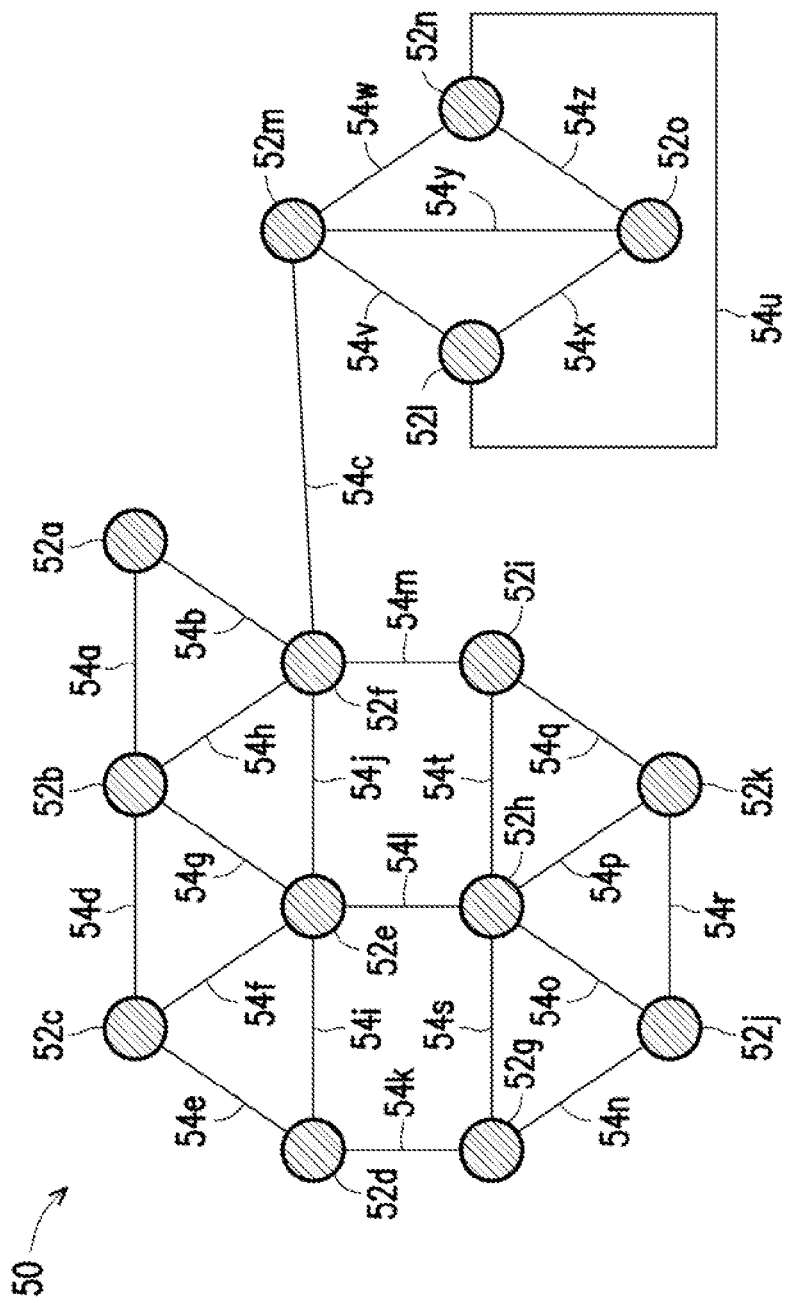
FIGS. 3A-3F illustrates a graph representative of a circuit layout having the triple patterning checking method of FIG. 2 applied thereto, in accordance with some embodiments.
Figure 3B:
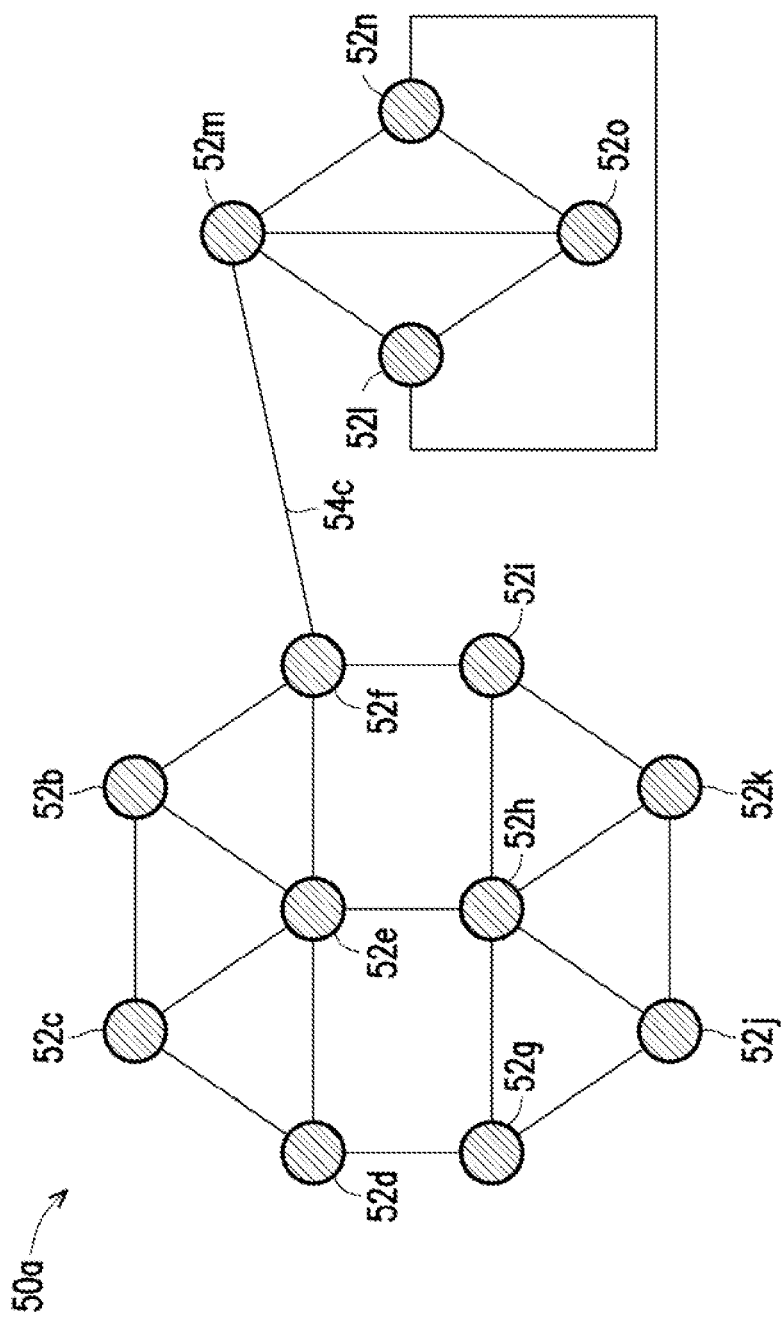
Figure 3C:
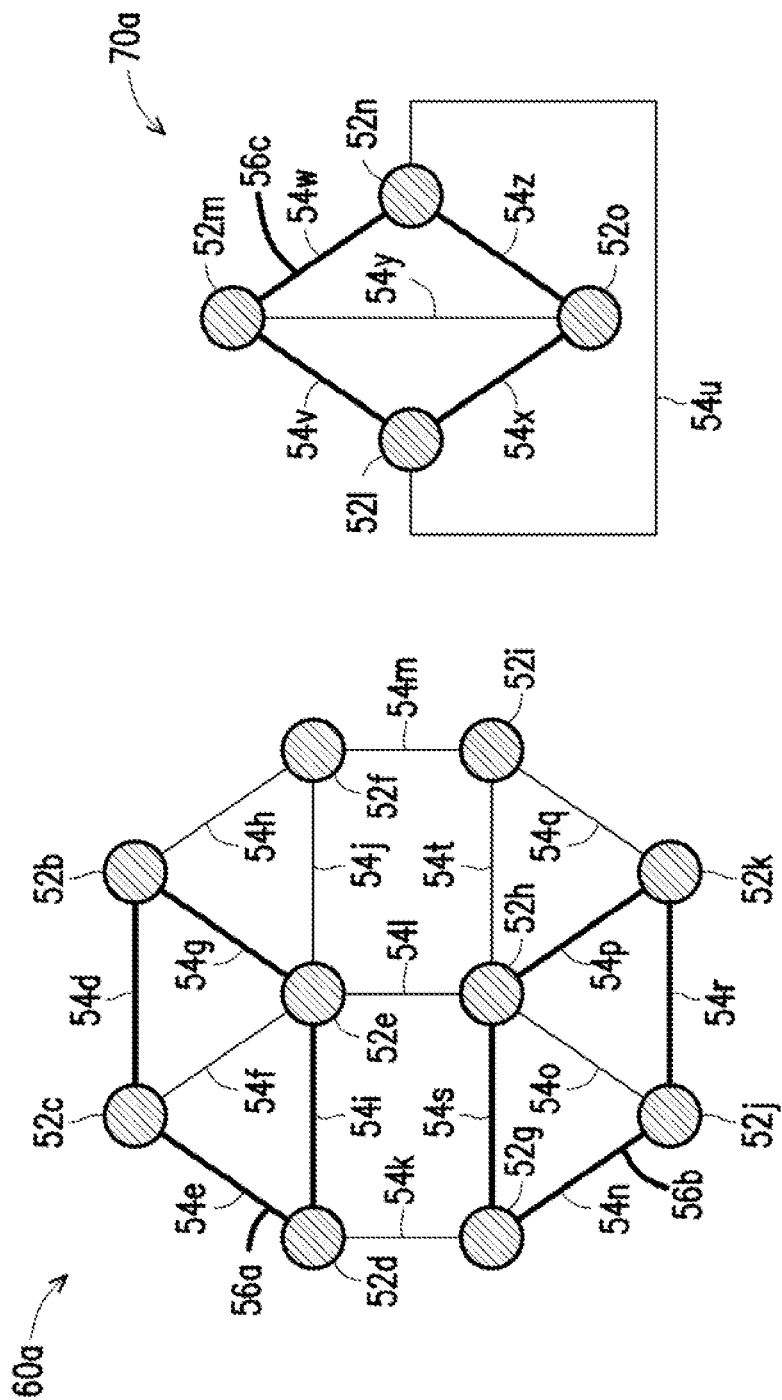
Figure 3D:
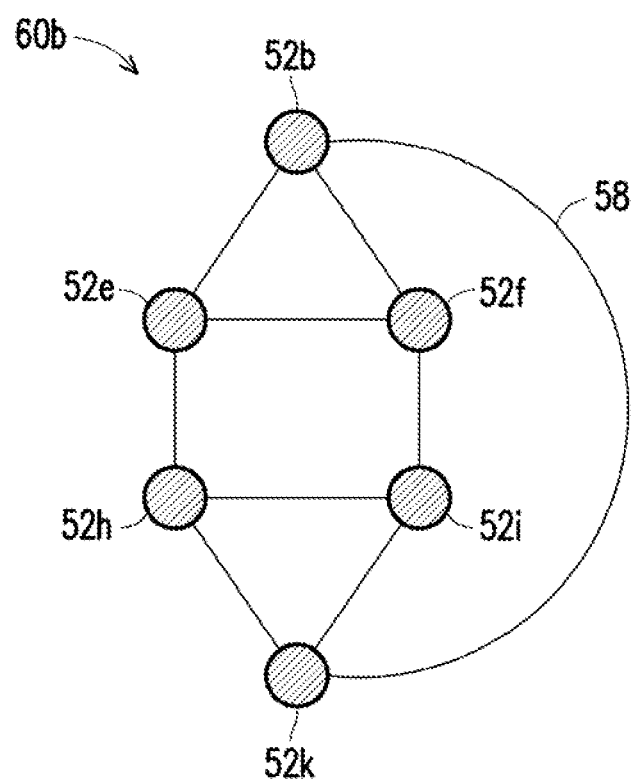
Figure 3E:
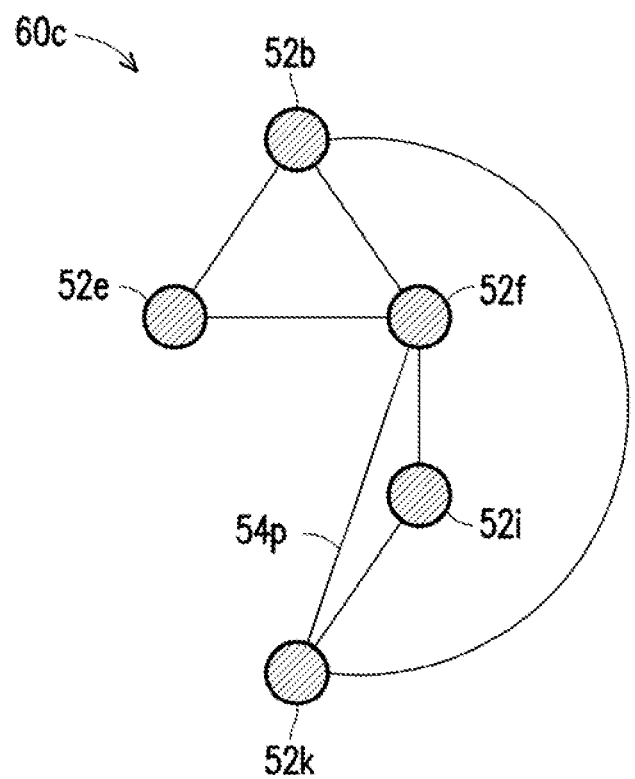
Figure 3F:
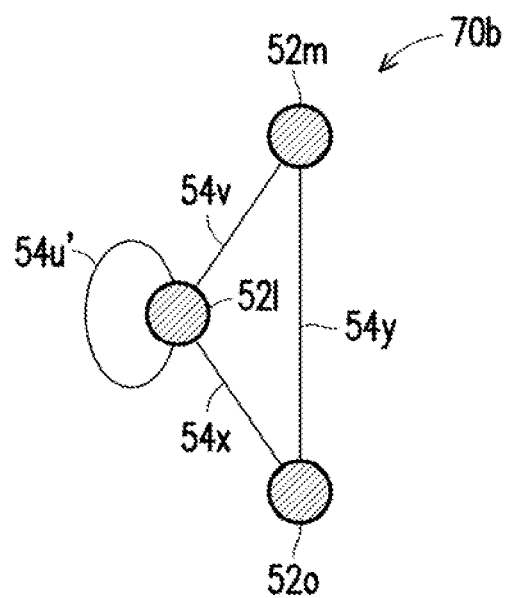
Figure 4:
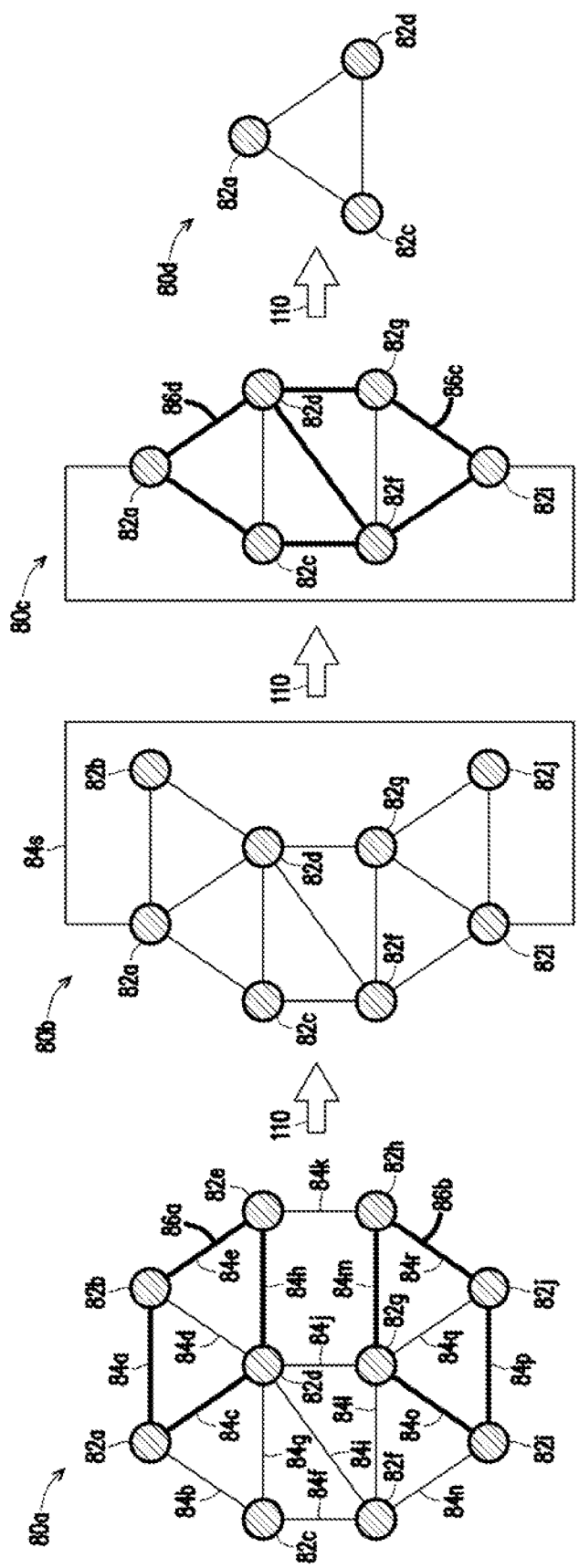
FIG. 4 illustrates a graph representative of a circuit layout having a $K_{3-1}$ reduction process iteratively applied thereto, in accordance with some embodiments.

FIG. 2 illustrates a triple patterning checking flow method 100a, in accordance with some embodiments. The triple patterning checking flow method 100a determines whether a circuit layout is compatible with a three-photomask photolithographic process. At step 102, a circuit layout is generated using one or more known circuit layout techniques. The circuit layout can be represented as a graph having a plurality of vertices (representing each of the conductive lines) and a plurality of edges (representing spacing between the conductive lines that is less than predetermined minimum spacing). FIGS. 3A-5 illustrate various embodiments of graphs 50, 80a, 90a representative of one or more circuit layouts. For example, as shown in FIG. 3A, graph 50 includes a plurality of vertices 52a-52o and a plurality of edges 54a-54z representative of a first circuit layout (not shown). As another example, as shown in FIG. 4, graph 80a includes a plurality of vertices 82a-82i and a plurality of edges 84a-84r representative of a second circuit layout (not shown). At step 104, any vertices having less than three edges (i.e., two or fewer edges) are removed from the graph. Vertices having less than three edges can be removed, as such vertices can definitively be colored with one of the three colors without being adjacent to a vertex having the same color. For example, as shown in FIG. 3A, a first vertex 52a has a first edge 54a connecting to a second vertex 52b and a second edge 54b connecting to a sixth vertex 52f. The first vertex 52a can be assigned one of three colors color based on the colors assigned to the second vertex 52b and the sixth vertex 52f without potentially generating any conflicts in the graph 50. Because the color of the first vertex 52a can be determined solely from the colors of the second and sixth vertices 52b, 52f, the first vertex 52a can be ignored for the purposes of the triple patterning checking flow method 100a. FIG. 3B illustrates a reduced graph 50a after removal of the first vertex 52a.

At step 106, the graph is partitioned. Partitioning a graph includes separating the graph at single vertex connections to generate two or more separate, partial graphs. For example, as shown in FIG. 3B, the graph 50a can be separated at an third edge 54c extending between a sixth vertex 52c and a thirteenth vertex 52m to generate a first partial graph 60a and a second partial graph 70a, as shown in FIG. 3C. Graph partitioning is described in greater detail in U.S. Pat. No. 9,122,838, issued on Sep. 1, 2015, and entitled "Triple-Pattern Lithography Layout Decomposition," the disclosure of which is incorporated herein by reference in its entirety.

At step 108, a reduction process is applied to each of the partial graphs 60a, 70a to further reduce the complexity of the graph 60a, 70a prior to performing a triple patterning conflict check (e.g., three color coloring). The reduction process 108 reduces processing time and/or prevents overkill (e.g., over application of rules/brute force processing) for a triple patterning checking process. The reduction process 108 can include a $K_{4-1}$ reduction step 110 and a square loop reduction step 112. The $K_{4-1}$ reduction step 110 reduces one or more kites ($K_{4-1}$) in the graph to a triangle by combining two vertices in the kite. The partial graph 70a, illustrated in FIG. 3C, is one example of a kite ($K_4$). The kite ($K_4$) 70a includes four vertices 52l-52o and a plurality of edges 54u-54z. A first set of the plurality of edges 54v-54x connect the vertices 52m-52o in series to define a kite or square shape. A second set of the plurality of edges 54u, 54y extends between non-adjacent vertices.

A $K_{4-1}$ reduction reduces a kite ($K_4$) to a triangle ($K_3$) by merging a first vertex into a second, non-adjacent vertex. For example, as shown in FIG. 3C, the twelfth vertex 52l is located non-adjacent to the fourteenth vertex 52n. That is, the twelfth vertex 52l and the fourteenth vertex 52n are not connected by one of the first set of edges 54v-54x, 54z defining the perimeter of the kite. In some embodiments, the selected vertices are vertices not connected by an edge. That is, the selected vertices can be assigned the same color during triple patterning. The edge connections of the removed vertex 52n are added to the vertex 52l into which the removed vertex 52n is merged. For example, as shown in FIG. 3C, the fourteenth vertex 52n has edge connections 54u, 54w, 54z to each of the other vertices 52l-52m, 52o in the kite graph 70a. The edge connections of the fourteenth vertex 52n are added to the twelfth vertex 52l when the fourteenth vertex 52n is removed from the graph 70a. If the remaining vertex 52l contains connections to the same vertices as the merged vertex 52n, the edges are not added to the remaining vertex 52l. For example, the twelfth vertex 52l has edge connections 54r, 54x to the thirteenth vertex 52m and the fifteenth vertex 52o prior to the merger. Therefore, the edges 54w, 54z between the fourteenth vertex 52n and each of the thirteenth vertex 52m and the fifteenth vertex 52o are not added to the twelfth vertex 52l, as they are subsumed within the already existing edges 54u, 54x. If the merged vertices 52l, 52n are connected by an edge 54u, the edge 54u becomes a loop 54u' connecting to the remaining vertex 52l, as shown in FIG. 3F. If a loop 54u' is generated during a $K_{4-1}$ reduction, the graph 70a cannot be colored using three colors and the therefore is not triple patterning compliant. For example, the reduced graph 70b includes a loop edge 54u, indicating that the original partial graph 70a is not three-color colorable. The circuit layout corresponding to the partial graph 70a is not compatible with a triple patterning lithographic process due to spacing between the conductive lines, and at least the partial graph 70a of the original graph 50 must be redesigned. In some embodiments, a $K_{4-1}$ reduction step 110 can be iteratively executed to reduce additional $K_4$ graphs. For example, FIG. 3D is a reduced graph 60b illustrating the partial graph 60a after undergoing two $K_{4-1}$ reductions (as discussed in greater detail below with respect to FIG. 6).

Figure 5:
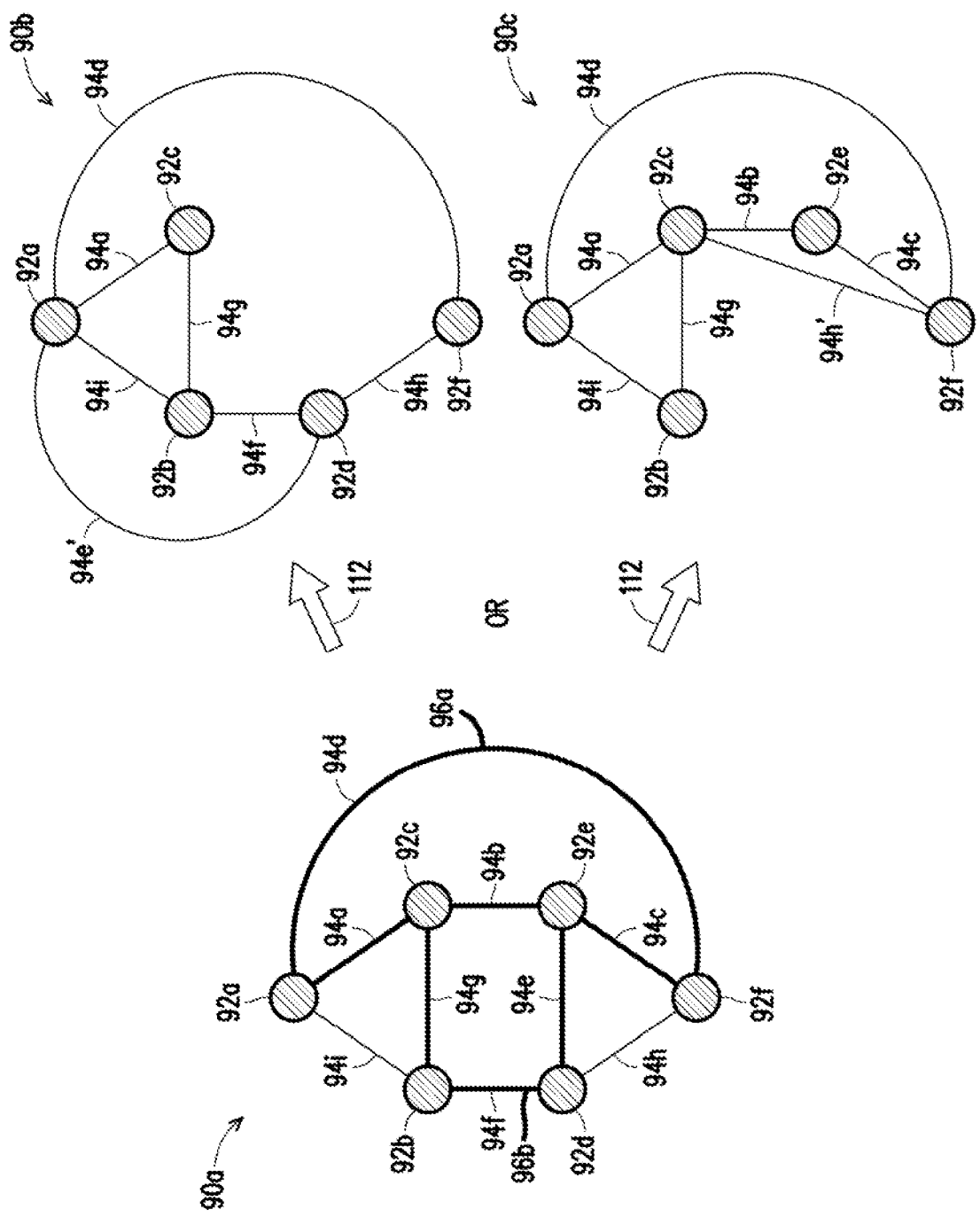
FIG. 5 illustrates a graph representative of a circuit layout having a square-loop reduction process applied thereto, in accordance with some embodiments.

In some embodiments, the reduction process at step 108 includes a square loop reduction step 112. As used herein, square loops are defined by four vertices connected by a plurality of edges to define a perimeter without any additional edges between non-adjacent vertices and do not necessarily require the perimeter to define a square shape. FIG. 5 illustrates a graph 90a including two square loops 96a, 96b, in accordance with some embodiments. The graph 90a includes a first square loop 96a defined by a first vertex 92a, a third vertex 92c, a fifth vertex 92e, and a sixth vertex 92f. A first edge 94a connects the first vertex 92a to the third vertex 92c, a second edge 94b connects the third vertex 92c to the fifth vertex 92e, a third edge 94c connects the fifth vertex 92e to the sixth vertex 92f, and a fourth edge 94d connects the sixth vertex 92f to the first vertex 92a. The graph 90a further includes a second square loop 96b defined by the second vertex 92b, the third vertex 92c, the fourth vertex 92d, and the fifth vertex 92e. The second edge 94b connects the third vertex 92c to the fifth vertex 92e, a fifth edge 94e connects the fifth vertex 92e to the fourth vertex 92d, a sixth edge 94f connects the fourth vertex 92d to the second vertex 92b, and a seventh edge 94g connects the second vertex 92b to the third vertex 92c.

A square loop 96a, 96b can be reduced by selecting one pair of diagonal nodes for combination. The selected pair of diagonal vertices can be the diagonal vertices having the largest separation as defined by the sum of the two edges separating the vertices (e.g., the length of each edge connecting the diagonal vertices in series is greater than the length of each of the edges connecting other diagonal vertices in series). For example, reduced graph 90b illustrates the graph 90a after the first square loop 96a is reduced by merging the first vertex 92a and the fifth vertex 92e. The edge connections of the merged vertices 92e are maintained. For example, the fifth vertex 92e is connected to the third vertex 92c, the fourth vertex 92d, and the sixth vertex 92f prior to being merged with the first vertex 92a. The first vertex 92a has edge connections to the second vertex 92b, the third vertex 92c, and the sixth vertex 92f prior to the merger. After merging the vertices 92a and 92e, the remaining vertex, the first vertex 92a, has edge connections 94a, 94d, 94i, 94e' to the second vertex 92b, the third vertex 92c, the fourth vertex 92d and the sixth vertex 92f. The edge 94e' between the first vertex 92a and the fourth vertex 92d is added to the first vertex 92a to reflect the original edge connection 92e between the fourth vertex 92d and the merged fifth vertex 92e.

As another example, reduced graph 90c illustrates the graph 90a after the second square loop 96b is reduced by merging the fourth vertex 92d into the third vertex 92c. The fourth vertex 92d has edge connections to the second vertex 92b, the fifth vertex 92e, and the sixth vertex 92f prior to being merged with the second vertex 92b. The third vertex 92c has edge connections to the first vertex 92a, the second vertex 92b, and the fifth vertex 92e. After merging the vertices 92c and 92d, the remaining vertex, the third vertex 92c, has edge connections 94a, 94b, 94g, 94h' to the first vertex 92a, the second vertex 92b, the fifth vertex 92e, and the sixth vertex 92f. The edge 94h' between the second vertex 92b and the sixth vertex 92f is added to the second vertex 92a to reflect the original edge connection 94h between the sixth vertex 92f and the merged fourth vertex 92d.

After reducing the graph at step 108, a triple patterning check is performed on the reduced graph at step 114. The triple patterning check can include any suitable triple patterning check, such as, for example, a brute-force triple coloring process, a heuristic triple coloring process, a rules-based triple coloring process, and/or any other suitable triple coloring process. If the reduced graph, such as reduced graph 60b, 60c, 90b, 90c passes the triple patterning check, the original graph is compatible with a triple patterning lithography process.

In some embodiments, the triple patterning checking method 100a is iterated until the graph is reduced as far as possible. For example, as shown in FIG. 4, an original graph 80a can be reduced to the reduced graph 80d by two iterations of a $K_{4-1}$ reduction process. If the reduction process of step 108 is further applied to the reduced graph 80d, the graph can be reduced to nothing as described in greater detail below, indicating that the original graph 80a is compatible with a three-color coloring. In some embodiments, the method 100a is iterated until original graph 80a is reduced to nothing (indicating a passed result) or until the original graph 80a cannot be further reduced, at which point the triple patterning check at step 114 is performed.

FIG. 4 illustrates one embodiment of the triple patterning checking method 100a as applied to a graph 80a. The graph 80a includes a plurality of vertices (or nodes) 82a-82j representative of a plurality of conductive traces and a plurality of edges 84a-84r representing spacing less than a minimum predetermined spacing between the conductive lines. The triple patterning checking method 100a is applied to the graph 80a. There are no nodes with less than three edge connections, so the method 100a proceeds to reduction process 108. At step 110, one or more kites ($K_4$) are reduced. For example, in some embodiments, two kites 86a, 86b are reduced by a $K_{4-1}$ reduction process at step 110. The first kite 86a includes a first vertex 82a, a second vertex 82b, a fourth vertex 82d, and a fifth vertex 82e. The perimeter of the first kite 86a is defined by a plurality of edge connections 84a, 84c, 84e, 84h. The second vertex 82b and the fourth vertex 82d are coupled by an internal edge 84d. Similarly, the second kite 86b includes a seventh vertex 82g, an eighth vertex 82h, a ninth vertex 82i, and a tenth vertex 82j. The perimeter of the second kite 86b is defined by a plurality of edge connections 84m, 84o, 84p, 84r and the kite 86b includes an edge connection 84q between the seventh vertex 82g and the tenth vertex 82j.

The identified kites 86a, 86b are reduced by a $K_{4-1}$ reduction process. With respect to the first kite 86a, the fifth vertex 82e is merged into the first vertex 82a. Similarly, with respect to the second kite 86b, the eighth vertex 82h is merged with the ninth vertex 82i. In the illustrated embodiment, the vertices 82a, 82e, 82h, 82i selected for combination are non-adjacent vertices not having an edge connection therebetween, e.g. are capable of being colored the same color. The edge connections of the merged vertices 82e, 82h are added to the remaining vertices 82a, 82i. An additional edge 84s is added between the first vertex 82a and the ninth vertex 82i to illustrate the edge connection 84k between the removed vertices 82e, 82h.

In some embodiments, after removing the identified kites 86a, 86b the first reduced graph 80b can be further reduced according to one or more steps of the method 100a. For example, the first reduced graph 80b includes a second vertex 82b and a tenth vertex 82j which each have two edge connections after the $K_{4-1}$ reduction. The second vertex 82b and the tenth vertex 82j can be removed from the first reduced graph 80b according to step 104 to generate a second reduced graph 80c. Additional reduction, such as one or more additional $K_{4-1}$ reductions can be performed to further reduce the graph 80c. For example, in some embodiments, an additional $K_{4-1}$ reduction can be applied to the second reduced graph 80c to remove a third kite 86c and a fourth kite 86d generated during the prior reductions. The additional $K_{4-1}$ reduction generates a reduced triangular graph 80d.

The reduced triangular graph 80d includes only vertices 82a, 82c, 82d having two edges, and therefore the reduced triangular graph 80d can be reduced to an empty graph according to step 104. The original graph 80a passes the triple patterning check at step 114 and the circuit layout represented by the original graph 80a is compatible with a triple-photomask photolithographic process. Each of the remaining vertices 82a, 82c, 82d in the reduced graph 80d are assigned one of three colors according to a triple patterning coloring process. Each of the merged vertices 82a-82j of the original graph 80a are unpacked from the reduced graph 80d while maintaining the same color as a corresponding vertex 82a, 82c, 82d in the reduced graph 80d. For example, when the first kite 86a was reduced, the fifth vertex 82e was merged into the first vertex 82a. If the first vertex 82a is assigned a first color, the fifth vertex 82e is also assigned the first color and can be unmerged (i.e., added back to the graph 80d). In some embodiments, colors are assigned to merged vertices without adding the merged vertices back to the graph 80d. As another example, during reduction of the second kite 86b, the eighth vertex 82h is merged into ninth vertex 82i. The ninth vertex 82i can subsequently merged into the fourth vertex 82d during a later $K_{4-1}$ reduction. The fourth vertex 82d can be assigned a third color. The ninth vertex 82i, which was merged into the fourth vertex 82d and the eighth vertex 82h, which was merged into the ninth vertex 82i, are each also assigned the third color. Each of the conductive lines in the circuit layout corresponding to the graph 80a can be assigned to one of three photomasks based on the color assigned to the respective vertex 82a-82j.

Figure 6:
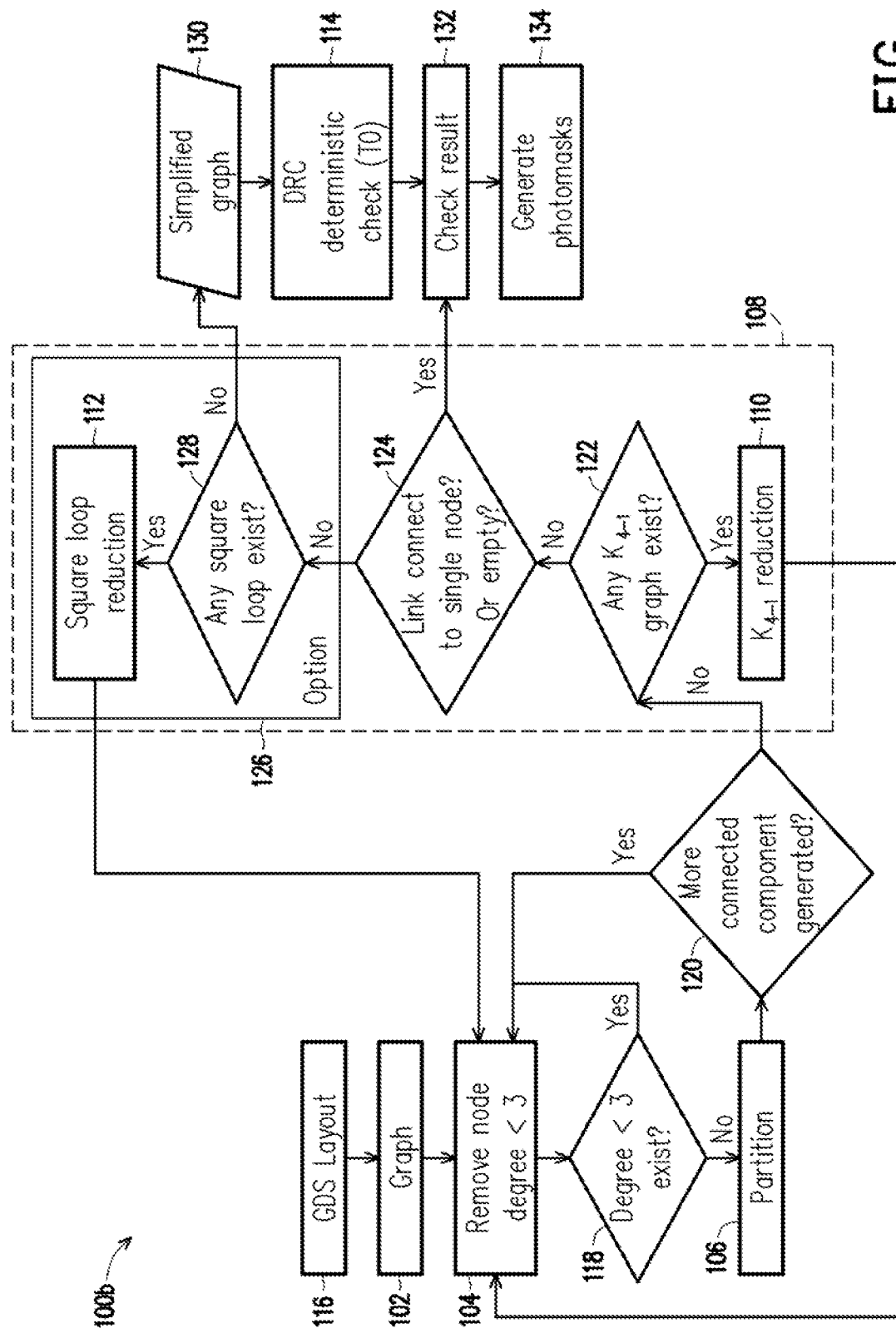
FIG. 6 is a flow chart illustrating a method of forming photomasks for a triple patterning photolithographic process, in accordance with some embodiments.

FIG. 6 illustrates one embodiment of a method 100b of generating a first photomask, a second photomask, and a third photomask for use in a triple patterning lithography process, according to some embodiments. The method 100b includes steps similar to those discussed above with respect to method 100a, and similar description is not repeated herein. The method 100b is discussed herein with respect to FIGS. 3A-3F and 6. A circuit layout including a plurality of conductive lines is generated at step 116. At step 102, the circuit layout is converted to a graph, such as graph 50, including a plurality of vertices 52a-52o representing each of the conductive lines in the circuit layout. A plurality of edges 54a-54z are indicative of a spacing less than a predetermined minimum spacing between the conductive lines in the circuit layout.

At step 104, each vertex 54a having less than three edges is removed from the graph 50 to generate a first reduced graph 50a. As noted above, vertices having two or fewer edges can be definitively colored with one of the three colors without being adjacent to a vertex having the same color. At step 118, a check is performed to determine if any of the remaining vertices 52b-52o have two or fewer edges as a result of the removal of the vertex 52a. If a vertex with two or fewer edges is identified, the method 100b returns to step 104. If none of the remaining vertices 52b-52o have two or fewer edges, the reduced graph 50a is partitioned at step 106. The partitioning step 106 separates the graph 50a into a first partial graph 60a and a second partial graph 70a. Each of the partial graphs 60a, 70a are separately checked by the method 100b. At step 120, the method 100b determines whether the partitioning of step 106 has generated any additional connected components. If edges are removed from one or more components during partitioning, the method 100b returns to step 104. If the graph cannot be further partitioned and/or edges are not removed, the method 100b proceeds to a $K_4$ reduction process 108.

A $K_4$ reduction process is performed to reduce each of the partial graphs 60a, 70a to one or more simplified graphs. Simplifying the partial graphs 60a, 70a reduces processing time and/or overkill for a subsequent triple patterning checking. At step 122, the reduction process determines whether any kites ($K_4$) exist within the partial graphs 60a, 70a. For example, the first partial graph 60a includes at least two kites 56a, 56b. The first kite 56a is defined by the second vertex 52b, the third vertex 52c, the fourth vertex 52d, and the fifth vertex 52e. The second kite 56b is defined by the seventh vertex 52g, the eighth vertex 52h, the tenth vertex 52j, and the eleventh vertex 52k. As another example, the second partial graph 70a is a kite graph 56c defined by the twelfth vertex 52l, the thirteenth vertex 52m, the fourteenth vertex 52n, and the fifteenth vertex 52o.

If a kite 56a-56c ($K_4$) is identified in one of the partial graphs 60a, a $K_{4-1}$ reduction is performed at step 110. For example, the first partial graph 60a is reduced to by performing a $K_{4-1}$ reduction on each of the first and second kites 56a, 56b. The first kite 56a is reduced by merging the fourth vertex 52d into the second vertex 52b and the second kite 56b is reduced by merging the seventh vertex 52f into the eleventh vertex 52k. After merging the vertices 52b, 52d, 52f, 52k of the first kite 56a and the second kite 56b respectively, the partial graph 60a would include vertices 52c, 52j having two or fewer edge connections (not shown). These vertices 52c, 52j can be removed according to step 104 to generate the reduced graph 60b of FIG. 3D. The edge connections of each of the merged vertices 52d, 52f are added to the remaining vertices 52b, 52k. Similarly, the second partial graph 70a is reduced by merging the fourteenth vertex 52n into the twelfth vertex 52l to generate the reduced graph 70b of FIG. 3F. The edge connections of each of the merged vertex 52l are added to the remaining vertex 52o. A new edge 58 is added to the partial graph 60b between the remaining vertices 52b, 52k to represent the edge connection 52k between the removed vertices 52d, 52g.

At step 124 the method 100b determines whether any edges (or links) connect to a single node (i.e., define a loop) or are empty at one or more sides (i.e., do not connect to a vertex at one or more sides). For example, as shown in FIG. 3F, the reduced graph 70b includes an edge 54u' defining a loop at the twelfth node 52l. If the method 100b determines that there are loop edges 54u', the method 100b generates a failure for at least the partial graph 70a at step 132. A failure indicates that the proposed circuit layout represented by at least the partial graph 70a is not compatible with triple patterning lithography and must be redesigned and/or assigned to a higher-number patterning process. In some embodiments, the method 100b processes the first partial graph 60a and the second partial graph 70a separately, such that a failure of one partial graph 70a does not preclude passing another partial graph 60a. In other embodiments, failure of a first partial graph 70a causes failure of the entire original graph 50.

If the method 100b determines that at least one reduced graph 60b does not include single node or empty node edges at step 124, the method 100b can perform an optional square loop reduction process 126. In some embodiments, the method 100b skips the square loop reduction process 126 and proceeds directly to step 130. If a square loop reduction process 126 is performed, a square loop check is performed at step 128 to identify one or more square loops in a graph. If one or more square loops are identified, a square loop reduction can be performed at step 112. For example, FIG. 5 is a graph 90a including at least two square loops 96a, 96b, in accordance with some embodiments. The first square loop 96a is defined by a first vertex 92a, a third vertex 92c, a fifth vertex 92e, and a sixth vertex 92f and the second square loop 96b is defined by the second vertex 92b, the third vertex 92c, the fourth vertex 92d, and the fifth vertex 92e. One or more of the square loops 96a, 96b can be reduced by merging non-adjacent vertices having a longest path distance therebetween, according to step 112 (as described above). For example, a first square-loop reduced graph 90b can be generated by merging the fifth vertex 92e into the first vertex 92a. As another example, a second square-loop reduced graph 90c can be generated by merging the fourth vertex 92d into the third vertex 92c. Although examples are shown merging only one of the square loops 96a, 96b, it will be appreciated that both square loops 96a, 96b can be reduced during a square loop reduction process 126.

Referring back to FIGS. 3A-3F and 6, in some embodiments after performing the square loop reduction process 126, the method 100b returns to step 104 and iterates the triple-patterning reduction process 100b on a reduced graph 60b and/or a square loop reduced graph 60c. In some embodiments, the method 100b is performed iteratively until either the original graph 50 is reduced to nothing (indicating a positive checking result) or cannot be further reduced. If the original graph 50 cannot be further reduced, the method 100b generates a final simplified graph at step 130 and performs a triple patterning conflict check on the simplified graph at step 114. In some embodiments, the method 100b proceeds to step 130 after a predetermined number of iterations through the reduction process 108.

The triple patterning check at step 114 can be any suitable triple patterning check, such as, for example, a brute-force triple patterning check, a heuristic triple patterning check, a DRC deterministic check, and/or any other suitable check. A check result is proved at step 132 based on the triple patterning check. If the check result is positive, a plurality of photomasks are generated for a photolithographic process at step 134. In some embodiments, three photomasks are generated for a triple patterning photolithographic process. Each of the photomasks include the conductive lines assigned the same color. For example, in some embodiments, the first photomask includes conductive lines having a corresponding vertex assigned a first color, the second photomask includes conductive lines having a corresponding vertex assigned a second color, and the third photomask includes conductive lines having a corresponding vertex assigned a third color. The photomasks can be formed using one or more known processes. If the check result is negative, the circuit layout is identified for revision.

Figure 7:
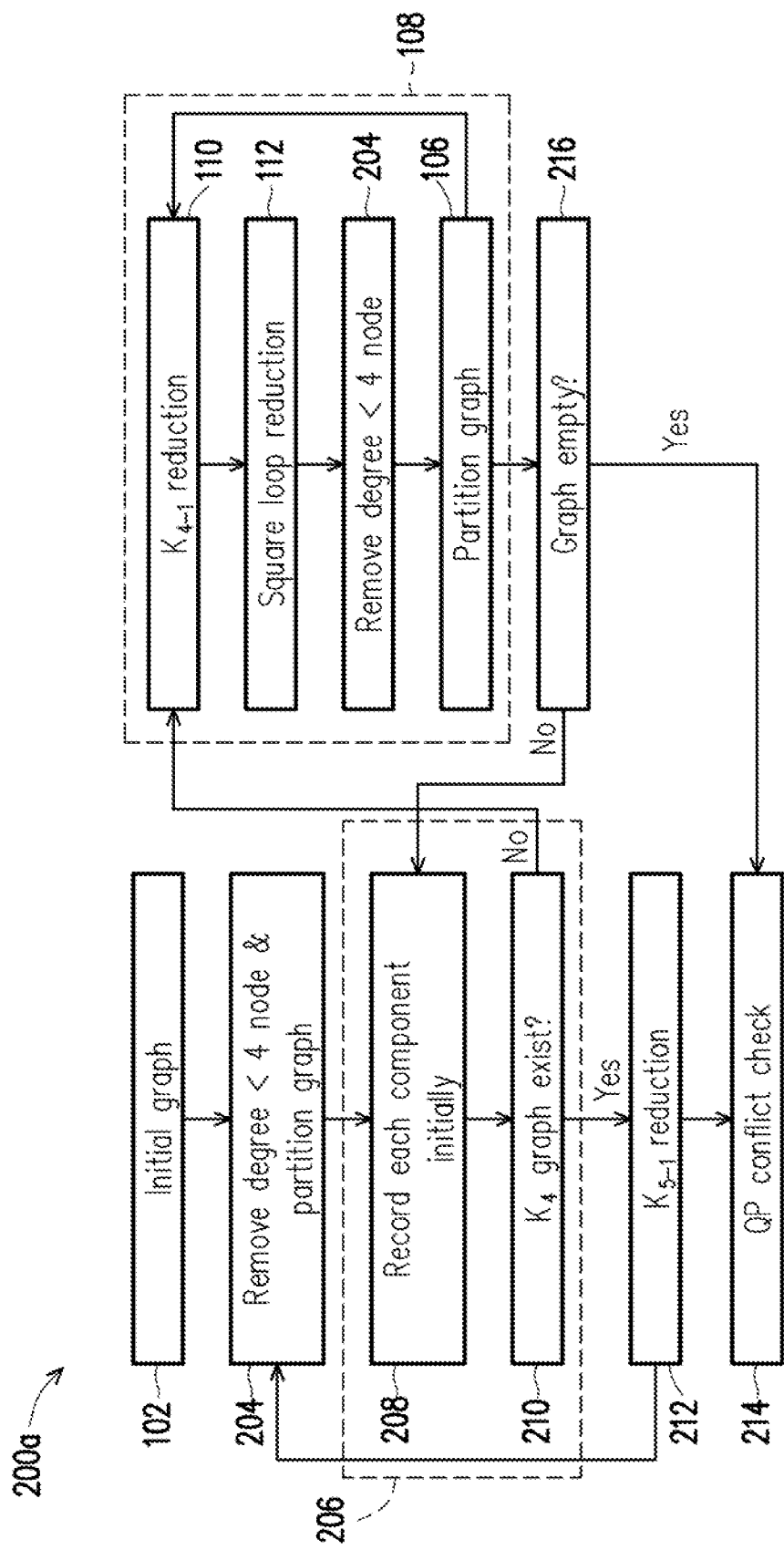
FIG. 7 is a flow chart illustrating a quadruple patterning checking method, in accordance with some embodiments.
Figure 8A:
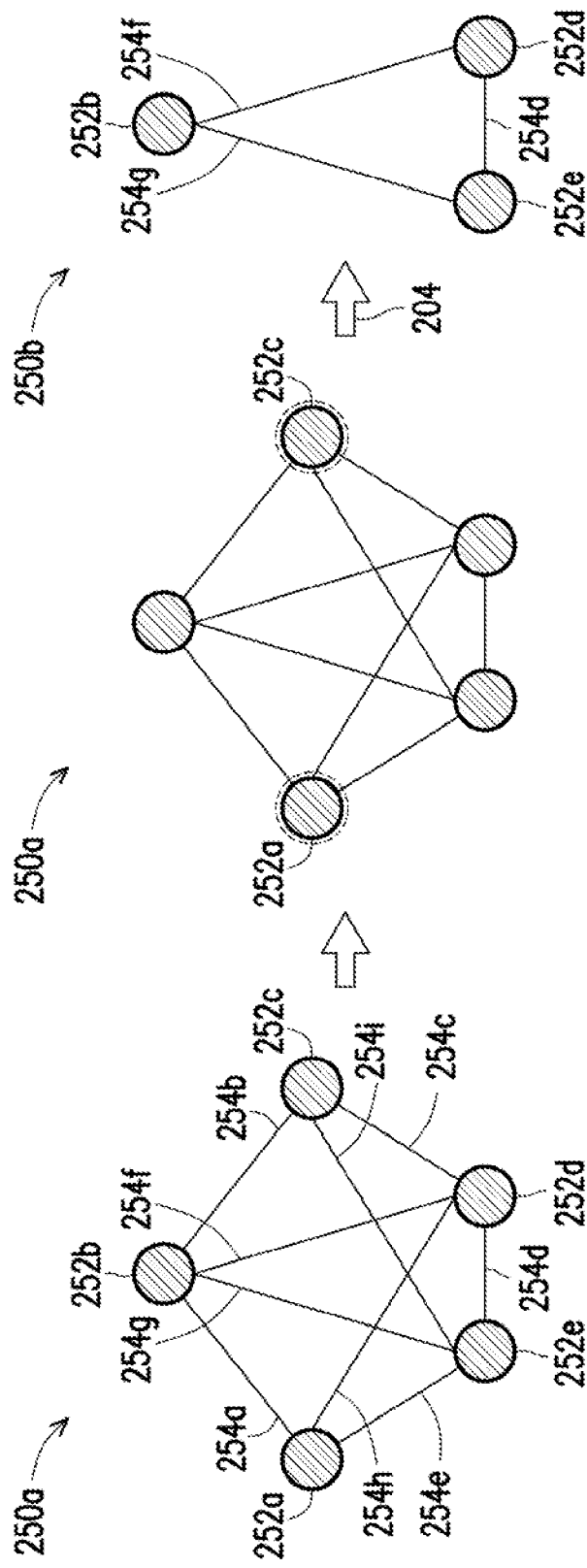
FIGS. 8A and 8B illustrate graphs representative of circuit layouts having the quadruple patterning checking method of FIG. 7 applied thereto, in accordance with some embodiments.
Figure 8B:
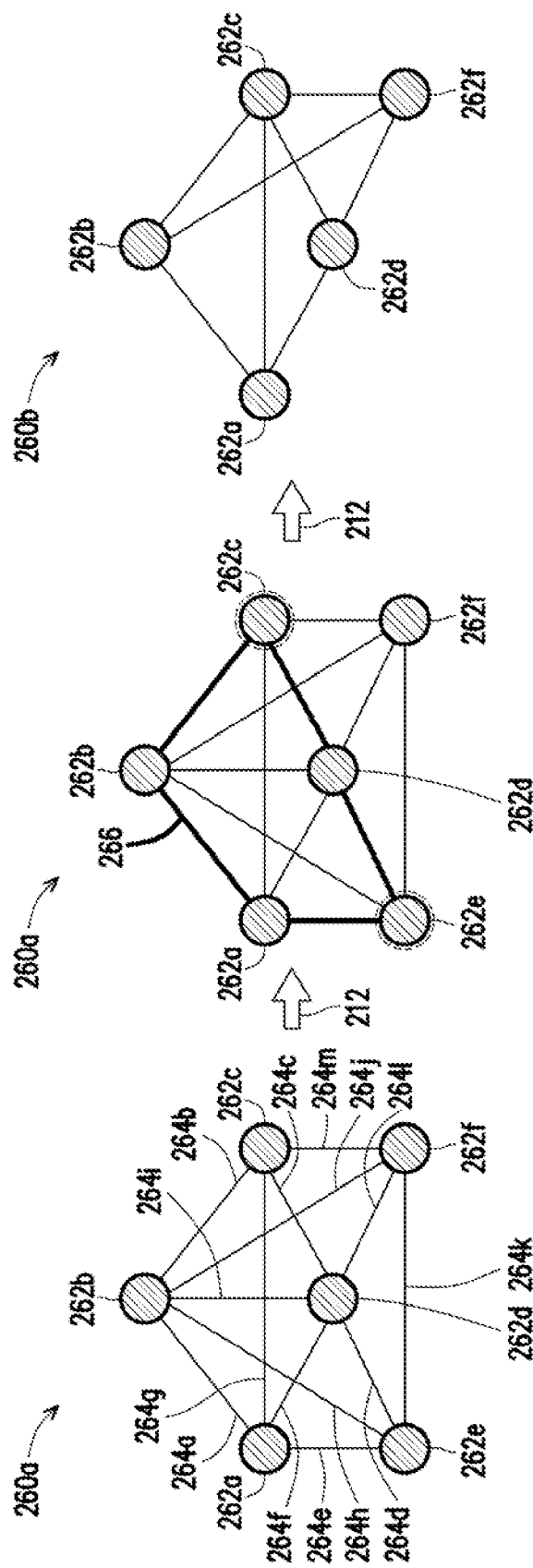

FIG. 7 is a flow chart illustrating a quadruple patterning checking method 200a, in accordance with some embodiments. The quadruple patterning checking method 200a is similar to the triple patterning checking flow method 100a described above and similar description is not repeated herein. The quadruple patterning checking flow method 200a is configured to check a circuit layout for compatibility with a quadruple patterning lithography process that utilizes four photomasks for patterning a circuit. FIGS. 8A and 8B illustrate various graphs 250a, 260a having a quadruple checking method 200a applied thereto.

At step 204, vertices having fewer than 4 (i.e., three or fewer) edge connections are removed from the graph 250a, 260a. Step 204 is similar to step 104 of method 100a, but expanded to allow for the use of four colors in a quadruple patterning check. For example, as shown in FIG. 8A, the graph 250a includes a first vertex 252a and a third vertex 252c each having only three edges 254a, 254e, 254h and 254b, 254c, 254i extending respectively therefrom. Each of the vertices 252a, 252c can be removed from the graph, as the vertices 252a, 252c can definitively be colored with one of the four colors without being adjacent to a vertex having the same color. A reduced graph 250b can be generated by removing the first vertex 252a and the third vertex 252c. The reduced graph 250b is a triangle graph including vertices 252b, 252d, and 252e having only three or fewer edge connections and can be further reduced to an empty graph according to step 204, indicating that the graph 250a passes the quadruple patterning check and is compatible with a quadruple photomask lithographic process (as discussed in more detail below).

If the method 200a is performing a first iteration, an initial process 206 is performed. On subsequent iterations through the method 200a, the initial process 206 is skipped. During the initial process, each component in the graph (after removal of all vertices having less than four edges) are recorded at step 208. A check is performed at step 210 to determine whether any $K_4$ graphs exist, such as kite graphs and/or square loop graphs. If no $K_4$ graphs are identified, the graph can be reduced using a triple patterning reduction. The method 200a proceeds to a triple patterning reduction process 108. The triple patterning reduction process 108 is described above in conjunction with FIGS. 1-6, and similar description is not repeated herein. The triple patterning reduction process 108 reduces $K_4$ graphs in the original graph 250a, 260a. In some embodiments, the triple patterning reduction process 108 can completely reduce an original graph, such as original graph 250a, indicating that the original graph 250a is compatible with a triple lithographic process and does not require use of a quadruple pattern lithographic process. In other embodiments, the triple patterning reduction process 108 partially reduces the original graph 250a, 260a and further processing is performed by the method 200a to verify compatibility with the quadruple patterning process.

After performing the triple patterning reduction process 108, the method 200a checks the graph 260a at step 216 to determine whether the graph 260a is empty. If the graph is empty, the method proceeds to step 214 to perform a quadruple coloring check, as described in more detail below. As noted above, a coloring check, such as a quadruple coloring check, can include a process of coloring one or more vertices of a graph. In embodiments in which the graph is reduced to an empty graph, the quadruple coloring check performs a quadruple coloring on the partial graph that is generated just prior to the empty graph. For example, as shown in FIG. 8A, the partial graph 250b includes three vertices 252b, 252d, 252e each only a single edge connection 254d, 254f, 254g. The partial graph 250b can be reduced to an empty graph according to step 206. If the graph 250b is reduced to an empty graph, the method 200a proceeds to step 214 and performs a quadruple coloring of the partial graph 250b, which was the last graph generated prior to the empty graph. If the graph 260a is not empty and/or the method 200a determines that the graph 260a contains one or more $K_4$ graphs at step 210, the method 200a proceeds to step 212.

At least one $K_{5-1}$ reduction is performed at step 212. A $K_5$ graph includes five vertices 262a-262e each having an edge connection 264a-264e defining an outer perimeter and at least one inner edge connection 264f-264i. For example, as shown in FIG. 8B, the graph 260a contains at least one $K_5$ graph 266. The $K_5$ graph 266 includes a first vertex 262a, a second vertex 262b, a third vertex 262c, a fourth vertex 262d, and a fifth vertex 262e. The first vertex 262a is connected to the second vertex 262b by a first edge 264a, the second vertex 262b is connected to the third vertex 262c by a second edge 264b, the third vertex 262c is connected to the fourth vertex 262d by a third edge 264c, the fourth vertex 262d is connected to the fifth vertex 262e by a fourth edge 264d, and the fifth vertex 262e is connected to the first vertex 262a by a fifth edge 264e. A sixth edge 264f connects the first vertex 262a and the fourth vertex 262d, a seventh edge 264g connects the first vertex 262a and the third vertex 262c, an eighth edge 264h connects the fifth vertex 262e and the second vertex 262b, and a ninth edge 264i connects the fourth vertex 262d and the second vertex 262b.

A $K_{5-1}$ reduction reduces the $K_5$ graph 266 by combining a first of the vertices 262a-262e of the $K_5$ graph 266 with a second of the vertices 262a-262e of the $K_5$ graph 266. For example, in some embodiments, the fifth vertex 262e is merged into the third vertex 262c. In some embodiments, the selected vertices 262c, 262e are not directly connected by an edge and can be assigned the same color during a quadruple coloring process. As shown in FIG. 8B, the graph 260a is reduced to a simplified graph 260b having only five vertices 262a-262d, 262f After performing the $K_{5-1}$ reduction, the method 200a can return to step 206 and remove any vertices having three or fewer edge connections. If four or fewer vertices remain in the graph after removing vertices at step 206, the graph 260a is compatible with a quadruple photomask lithographic process and the method 200a can proceed to step 214 to perform a quadruple coloring of the remaining vertices and/or the original graph 260a.

In some embodiments, if the graph 260b cannot be further reduced, either by a $K_{5-1}$ reduction, a $K_{4-1}$ reduction, and/or removal of vertices having fewer than four edges, the method 200a proceeds to step 214. At step 214, a quadruple patterning conflict check is performed on the reduced graph 260b. A quadruple patterning conflict check can include any suitable check, such as a brute-force four-color coloring, a heuristic quadruple patterning conflict check, a deterministic rules-based quadruple patterning conflict check, and/or any other suitable quadruple patterning conflict check. If the reduced graph 260b passes the quadruple patterning conflict check (i.e., the reduced graph 260b is four-color colorable without conflicts), the associated circuit layout represented by the original graph 260a is compatible with a quadruple photomask lithographic process. Four photomasks, each corresponding to one of the four colors used in the quadruple patterning conflict check, can be generated using one or more known methods. The four photomasks are used during a quadruple photolithographic process to form the circuit layout represented by the original graph 260a on a semiconductor substrate.

Figure 9A:
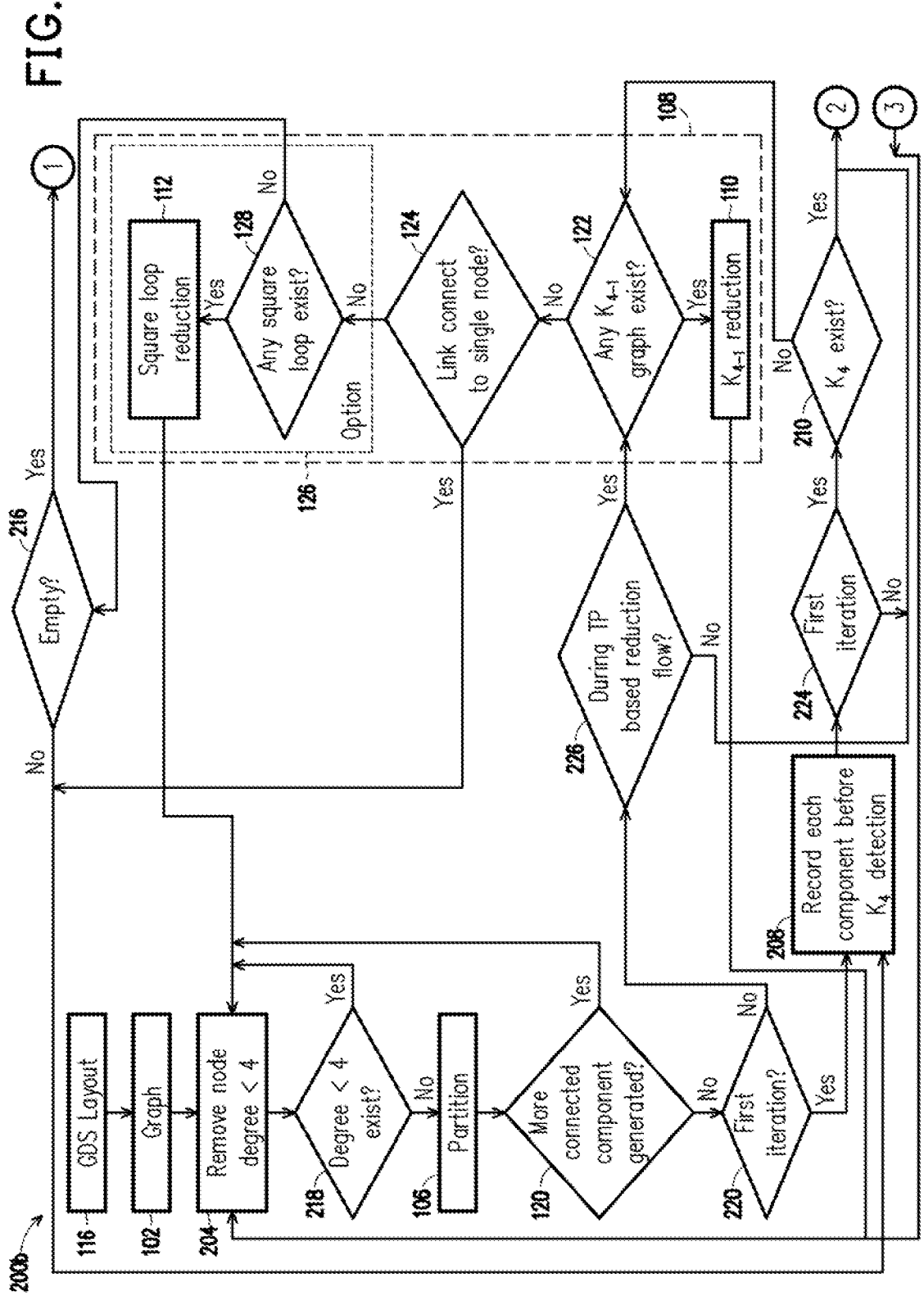
FIGS. 9A-9B are a flow chart illustrating a method of forming photomasks for a quadruple patterning photolithographic process, in accordance with some embodiments.
Figure 9B:
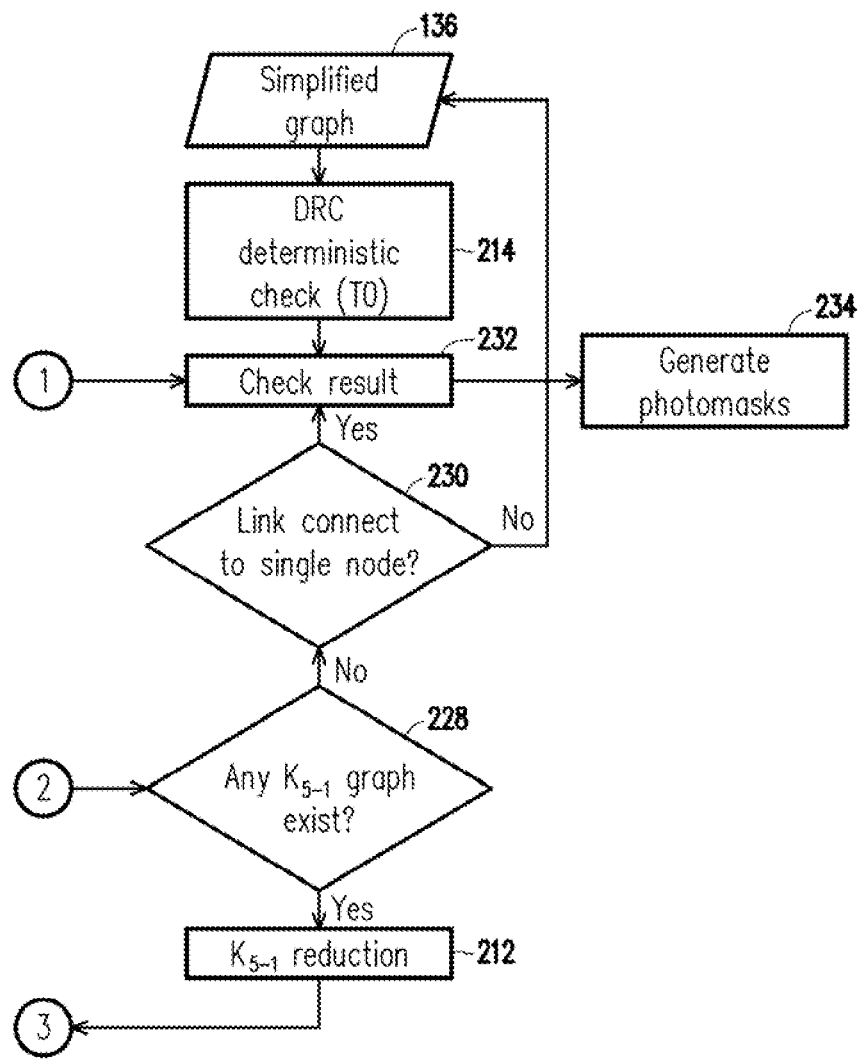

FIGS. 9A-9B are a flow chart illustrating a method 200b of generating photomasks for a quadruple photomask lithographic process. Circles 1, 2, and 3 illustrate connections between the steps shown in FIG. 9A and the steps shown in FIG. 9B. The method 200b is similar to quadruple patterning checking method 200a and the triple patterning checking flow methods 100a, 100b described above and similar description is not repeated herein. The method 200b is described herein with reference to FIGS. 8B and 9A-9B. At step 116, a circuit layout is generated and/or received from a remote source. The circuit layout includes a plurality of conductive lines. The circuit layout is converted into a graph 260a at step 202. The graph 260a includes a plurality of vertices 262a-262f representative of the plurality of conductive lines. A plurality of edges 264a-264m representing spacing less than a minimum predetermined spacing between the conductive lines.

At step 204, vertices 262a-262f having three or fewer edge connections are removed from the graph 260a. The graph 260a does not contain any vertices having three or fewer edges, and therefore no vertices are removed at step 204. At step 218, a check is performed to determine if the removal of vertices 262a-262f (if any) in step 204 causes one or more additional vertices 262a-262f to have only three or fewer edge connections. If vertices 262a-262f with three or fewer edge connections are identified, the method 200b returns to step 204. Otherwise, the graph 260a is partitioned at step 106, if possible.

After partitioning, the graph 260a is checked at step 212 to determine whether one or more additional connected components are generated during the partition. If additional connected components are generated, the method 200b returns to step 204. If no additional connected components are generated, the method 200b performs a check, at step 220, to determine if the current iteration of the quadruple patterning checking flow method 200b is a first iteration or a subsequent iteration. If the check determines that the current iteration is a first iteration, at step 208, each of the vertices 262a-262f in the graph 260a are recorded. After recording the graph 260a, an optional second check is performed at step 224 to determine if the current iteration of the quadruple patterning checking flow method 200b is a first iteration or a subsequent iteration. If the check determines that the current iteration is a first iteration, the method proceeds to step 210. If the check determines that the current iteration is not the first iteration, the method proceeds to step 228 (which is discussed in greater detail below).

At step 220, the method 200b checks whether any vertices 262a-262f have four ($K_4$) or more ($K_{5+}$) edge connections. If none of the vertices 252a-252f have four or more edge connections, the circuit layout corresponding to the graph 260a can be generated by a triple patterning lithography process and therefore a quadruple patterning checking flow is not required. The method 200b can perform a triple-pattern reduction process 108, as described above. At step 216, the method 200b determines whether the triple patterning reduction process 108 reduced the graph 260a to an empty graph. If so, the method 200b outputs a positive check result at step 232, indicating that the circuit layout represented by the graph 260a can be generated using one of a triple patterning or a quadruple patterning lithography process, depending on how the method 200b flow reached check result step 232. If the triple patterning reduction process 108 does not reduce the graph 260a to an empty graph, the method 200b returns to step 208 and iterates through the method 200b. If it is determined at step 210 that one or more vertices 262a-262f have four or more edge connections, the method 200b proceeds to step 228 (which is discussed in more detail below).

If, at step 220, the check determines that the current iteration is a second or later iteration (i.e., not a first iteration), the method 200b performs a check, at step 226 to determine whether a triple patterning reduction process 108 is currently being executed. For example, if a first iteration through the method 200b determines that the circuit layout corresponding to the graph 260a can be generated by a triple patterning lithography process, i.e., the method proceeded from step 210 to triple patterning reduction process 108, the check at step 226 will determine that a triple patterning reduction process 108 is currently being executed. If a triple patterning reduction process 108 is being executed, the method 200b returns to the triple patterning reduction process 108. If the check determines that a triple patterning reduction process 108 is not being performed, the method 200b proceeds to step 228.

At step 228, a check is performed to determine whether the graph 260 contains any $K_5$ graphs. For example, as shown in FIG. 8, the graph 260a contains at least one $K_5$ graph 266. If a $K_5$ graph 266 is identified, a $K_{5-1}$ reduction is performed at step 212. The $K_{5-1}$ reduction reduces the $K_5$ graph 266 by merging a first of the vertices 262e of the $K_5$ graph 266 with a second of the vertices 262c of the $K_5$ graph 266. In some embodiments, the selected vertices 262c, 262e are not directly connected by an edge and can be assigned the same color during a four-color coloring check. The graph 260a is reduced to a simplified graph 260b. After performing the $K_{5-1}$ reduction, the method 200b returns to step 204 and iterates through the method 200b.

If the check at step 228 fails to identify any $K_5$ graphs, a check is performed at step 230 to determine if any of the remaining edges connect to a single node (or no nodes), i.e., are looped and/or empty. If the check identifies a looped and/or empty edge, a check result indicating a failed check and requirement to redesign the circuit is output at step 232. If no looped or empty edges are identified, a final simplified graph 260b is generated at step 136 and provided for a quadruple patterning conflict check at step 214. The quadruple patterning conflict check can be any suitable conflict check, such as, for example, a brute-force four-color coloring, a heuristic quadruple patterning conflict check, a deterministic rules-based quadruple patterning conflict check, and/or any other suitable quadruple patterning conflict check. The output of the quadruple patterning check is provided at step 232.

If the quadruple patterning check output at step 232 is a positive result, the method proceeds to step 234 to generate a plurality of photomasks for a photolithographic process. In some embodiments, four photomasks are generated for a quadruple patterning photolithographic process. Each of the photomasks include the conductive lines assigned the same color. For example, in some embodiments, the first photomask includes conductive lines having a corresponding vertex assigned a first color, the second photomask includes conductive lines having a corresponding vertex assigned a second color, the third photomask includes conductive lines having a corresponding vertex assigned a third color, and the fourth photomask includes conductive lines having a corresponding vertex assigned a fourth color. The photomasks can be formed using one or more known processes. If the check result is negative, the circuit layout represented by the original graph 260a is identified for revision.

Figure 10:
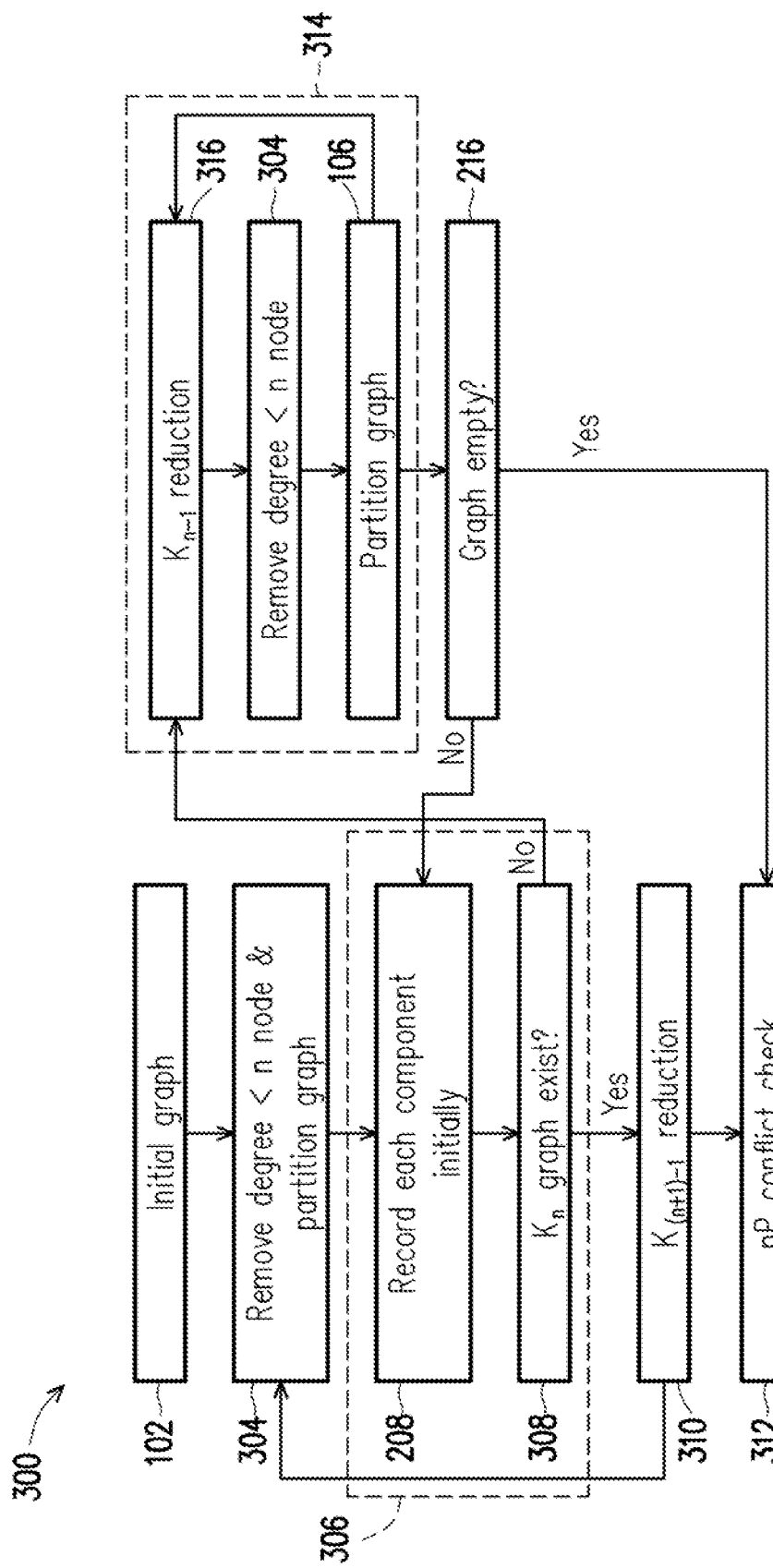
FIG. 10 is a flow chart illustrating a n-pattern checking method, in accordance with some embodiments.

FIG. 10 is a flow chart illustrating an n-pattern checking method 300, in accordance with some embodiments. The n-pattern checking method 300 is similar to the triple patterning checking method 100a and the quadruple patterning checking method 200a described above and similar description is not repeated herein. The n-pattern checking method 300 is configured to check a circuit layout for compatibility with an n-pattern lithography process that utilizes a predetermined number of photomasks (i.e., n photomasks) for patterning a circuit. For example, in various embodiments, n can equal any integer greater than 2.

At step 304, vertices having less than n edge connections are removed from the graph. Step 304 is similar to steps 104 of method 100a and step 204 of method 200b, but expanded to allow for the use of n colors in an n-pattern lithographic process. For example, in embodiments having n=5, step 304 removes any vertices having less than 5 (i.e. 4 or fewer) vertices. Similarly, in embodiment having n=6, step 304 removes any vertices having less than 6 (i.e., 5 or fewer) vertices.

If the method 300 is performing a first iteration, an initial process 306 is performed. On subsequent iterations through the method 300, the initial process 306 is skipped. During the initial process 306, each component in the graph (after removal of all vertices having less than n edges) are recorded at step 208. A check is performed at step 308 to determine whether any $K_n$ graphs exist. If no $K_n$ (or greater) graphs are identified, the method 300 proceeds to a $K_{n-1}$ patterning reduction process 308. For examples, in embodiments having n=4, the $K_{n-1}$ patterning reduction flow is a quadruple patterning reduction flow 200a as described above. In some embodiments, the $K_{n-1}$ reduction process 310 is an iteration of the n-pattern checking method 300 having n=n-1.

After performing the n-patterning reduction process 310, the method 300 checks the graph at step 316 to determine whether the graph is empty. If the graph is empty, the method proceeds to step 312. If the graph is not empty and/or the method 300 determines that the graph contains at least one $K_n$ graph at step 308, the method 300 proceeds to step 310.

At least one $K_{(n+1)-1}$ reduction is performed at step 310. A $K_{n+1}$ graph includes n+1 vertices each having an edge connection defining an outer perimeter and at least one inner edge connection. A $K_{(n+1)-1}$ reduction reduces the $K_{(n+1)}$ graph by combining a first vertex of the $K_{n+1}$ graph with a second vertex of the $K_{n+1}$ graph not directly connected to the first vertex. After performing the $K_{(n+1)-1}$ reduction, the method 300 can return to step 304.

In some embodiments, if the graph cannot be further reduced, either by a $K_{(n+1)-1}$ reduction, a $K_{n-1}$ reduction process, and/or removal of vertices having fewer than n edges, the method 300 can proceed to step 312. At step 312, a n-patterning conflict check is performed. The n-patterning conflict check can include any suitable check, such as a brute-force n-color coloring, a heuristic n-patterning conflict check, a deterministic rules-based n-patterning conflict check, and/or any other suitable n-patterning conflict check. If the graph passes the n-patterning conflict check, the circuit layout can be formed by an n-photomask lithographic process. N photomasks, each corresponding to one of the n colors used in the n-patterning conflict check, can be generated for forming the circuit layout on a semiconductor substrate.

FIG. 11 illustrates one embodiment of a system 400 for generating a plurality of photomasks according to one or more embodiments of the methods disclosed herein. The system 400 includes at least one electronic device 402 configured to control operation of photomask generation system 404. U.S. Pat. No. 8,775,977, issued Jul. 8, 2014, entitled "Decomposition and Marking of Semiconductor Device Design Layout in Double Patterning Lithography" and U.S. Pat. No. 9,360,750, issued Jun. 7, 2016, entitled "Balancing Mask Loading" disclose photomask and semiconductor circuit generation systems and are incorporated by reference herein in their respective entireties. The electronic device 402 is capable of implementing one or more of the methods of generating a plurality of photomasks 100a, 100b, 200a, 200b, 300 described above. The photomask generation system 404 may generate a photomask according to one or more known methods. The electronic device 400 is a representative device and may comprise a processor subsystem 406, an input/output subsystem 408, a memory subsystem 410, a communications interface 412, and a system bus 414. In some embodiments, one or more than one of the electronic device 402 components may be combined or omitted such as, for example, not including the communications interface 412. In some embodiments, the electronic device 402 may comprise other components not combined or comprised in those shown in FIG. 11. For example, the electronic device 402 also may comprise a power subsystem. In other embodiments, the electronic device 402 may comprise several instances of the components shown in FIG. 11. For example, the electronic device 402 may comprise multiple memory subsystems 410. For the sake of conciseness and clarity, and not limitation, one of each of the components is shown in FIG. 11.

The processor subsystem 406 may comprise any processing circuitry operative to control the operations and performance of the electronic device 402. In various aspects, the processor subsystem 406 may be implemented as a general purpose processor, a chip multiprocessor (CMP), a dedicated processor, an embedded processor, a digital signal processor (DSP), a network processor, a media processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 406 also may be implemented by a controller, a microcontroller, an application specific integrated circuit (ASIC), a field programmable gate array (FPGA), a programmable logic device (PLD), and so forth.

In various aspects, the processor subsystem 406 may be arranged to run an operating system (OS) and various applications. Examples of an OS comprise, for example, operating systems generally known under the trade name of Apple OS, Microsoft Windows OS, Android OS, and any other proprietary or open source OS. Examples of applications comprise, for example, a telephone application, a camera (e.g., digital camera, video camera) application, a browser application, a multimedia player application, a gaming application, a messaging application (e.g., email, short message, multimedia), a viewer application, and so forth.

In some embodiments, the electronic device 402 may comprise a system bus 414 that couples various system components including the processing subsystem 406, the input/output subsystem 408, and the memory subsystem 410. The system bus 412 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 408 may comprise any suitable mechanism or component to at least enable a user to provide input to the electronic device 402 and the electronic device 402 to provide output to the user. For example, the input/output subsystem 408 may comprise any suitable input mechanism, including but not limited to, a button, keypad, keyboard, click wheel, touch screen, or motion sensor. In some embodiments, the input/output subsystem 408 may comprise a capacitive sensing mechanism, or a multi-touch capacitive sensing mechanism.

In some embodiments, the input/output subsystem 408 may comprise a visual peripheral output device for providing a display visible to the user. For example, the visual peripheral output device may comprise a screen such as, for example, a Liquid Crystal Display (LCD) screen, incorporated into the electronic device 402. As another example, the visual peripheral output device may comprise a movable display or projecting system for providing a display of content on a surface remote from the electronic device 402. In some embodiments, the visual peripheral output device can comprise a coder/decoder, also known as a Codec, to convert digital media data into analog signals. For example, the visual peripheral output device may comprise video Codecs, audio Codecs, or any other suitable type of Codec.

The visual peripheral output device also may comprise display drivers, circuitry for driving display drivers, or both.

The visual peripheral output device may be operative to display content under the direction of the processor subsystem 406. For example, the visual peripheral output device may be able to play media playback information, application screens for application implemented on the electronic device 402, information regarding ongoing communications operations, information regarding incoming communications requests, or device operation screens, to name only a few.

In some embodiments, the communications interface 412 may comprises any suitable hardware, software, or combination of hardware and software that is capable of coupling the electronic device 402 to one or more networks and/or additional devices (such as, for example, the photomask generating system 404.) The communications interface 412 may be arranged to operate with any suitable technique for controlling information signals using a desired set of communications protocols, services or operating procedures. The communications interface 412 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery such as a photomask generating system 404, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery such as a photomask generating system 404, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, Fire-Wire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 412 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 412 may comprise a wireless interface comprising one or more antennas, transmitters, receivers, transceivers, amplifiers, filters, control logic, and so forth.

In various aspects, the communications interface 412 may provide voice and/or data communications functionality in accordance a number of wireless protocols. Examples of wireless protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 410.

In some embodiments, the memory subsystem 410 may comprise any machine-readable or computer-readable media capable of storing data, including both volatile/non-volatile memory and removable/non-removable memory. The memory subsystem 410 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the electronic device 402.

In various aspects, the memory subsystem 410 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferro-electric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 410 may contain an instruction set, in the form of a file for executing a method of generating one or more graphs (for example, from one or more circuit layouts provided to the electronic device 402), reducing the one or more graphs and checking the one or more graphs for compatibility with one or more photolithographic processes, as described herein. In some embodiments, the memory subsystem 410 contains instructions for optionally generating a plurality of photomasks 100a, 100b, 200, 200b, 300 using the photomask generating system 404. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 406.

It is understood that that the above described arrangements are only illustrative of the application of the principles of the present disclosure. Numerous modification and alternative arrangements may be devised by those skilled in the art without departing from the spirit and scope of the present invention. Thus, while the present invention has been shown in the drawing and fully described above with particularity and detail in connection with what is presently deem to be the practical and preferred embodiments of the disclosure, it will be apparent to those of ordinary skill in the art that numerous modifications, including, but not limited to, variations in size, materials, shape, form, function, manner of operation, assembly, and use may be made without departing from the principles and concepts of the disclosure.

In various embodiments, a method of generating a plurality of photomasks for a photolithographic process includes generating a circuit graph representative of a circuit layout having a plurality of conductive lines. The graph comprises a plurality of vertices and a plurality of edges. Each of the plurality of vertices is representative of a corresponding one of the plurality of conductive lines and each of the plurality of edges is representative of a spacing between the conductive lines less than an acceptable minimum distance. At least one $K_{n+1}$ graph is identified within the circuit graph. A $K_{n+1}$ graph comprises a first set of vertices selected from the plurality of vertices connected in series by a first set of edges selected from the plurality of edges and having at least one non-series edge connection between a first vertex and a second vertex selected from the first set of vertices. The first set of vertices comprises n+1 vertices, where n is any integer greater than 2. The at least one $K_{n+1}$ graph is reduced by merging a third vertex into a fourth vertex selected from the first set of the plurality of vertices. The third vertex has a second set of edges selected from the plurality of edges and the fourth vertex has a third set of edges selected from the plurality of edges. The third vertex is merged into the fourth vertex by removing the third vertex from the circuit graph and adding edges from the second set of edges to the third set of edges to generate a reduced circuit graph. The edges from the second set of edges are added to the third set of edges only if a the third set of edges does not include a corresponding edge. An n-pattern conflict check is performed on the reduced circuit graph. The plurality of photomasks are generated based on a result of the n-pattern conflict check.

In various embodiments, a method includes receiving a circuit layout comprising a plurality of conductive lines and generating a circuit graph representative of the circuit layout. The circuit graph comprises a plurality of vertices and a plurality of edges. Each of the plurality of vertices represents one of the plurality of conductive lines. Each of the plurality of edges is representative of a spacing between the conductive lines less than an acceptable minimum distance. The method further includes coloring the circuit graph with n colors where n is equal to any integer greater than 3. Each of the plurality of vertices is assigned one of the n colors based on an n-patterning checking process including at least one K(n+1)-1 graph reduction. The method further includes assigning each of the plurality of conductive lines to one of n photomasks based on a color of a corresponding vertex from the plurality of vertices and forming the n photomasks for use in a n-patterning photolithographic process.

In various embodiments, a method of generating a plurality of photomasks for a photolithographic process includes generating a circuit graph representative of a circuit layout having a plurality of conductive lines. The circuit graph comprises a plurality of vertices and a plurality of edges. Each of the plurality of vertices is representative of one of the plurality of conductive lines and each of the plurality of edges is representative of a spacing between the conductive lines less than an acceptable minimum distance. The circuit graph is reduced by one or more $K_{4\text{-}1}$ reductions and one or more square loop reductions to generate a reduced circuit graph comprising a set of the plurality of vertices in the circuit graph. The reduced circuit graph is checked for one or more triple patterning conflicts. The checking assigns one of three colors to each of the set of vertices in the reduced circuit graph. A first photomask, a second photomask, and a third photomask each comprising a set of the plurality of conductive lines of the circuit layout are generated. Each set of the plurality of conductive lines corresponds to one of three colors assigned to the set of vertices. The first color corresponds to the first photomask, the second color corresponds to the second photomask, and the third color corresponds to the third photomask.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of generating a plurality of photomasks for a photolithographic process, comprising:
   generating a circuit graph representative of a circuit layout having a plurality of conductive lines, wherein the graph comprises a plurality of vertices and a plurality of edges, wherein each of the plurality of vertices is representative of a corresponding one of the plurality of conductive lines, and wherein each of the plurality of edges is representative of a spacing between the conductive lines less than an acceptable minimum distance;
   performing at least one $K_{n+1}$ graph reduction of the circuit graph to generate a reduced circuit graph;
   performing an n-pattern conflict check on the reduced circuit graph; and
   generating a plurality of photomasks based on a result of the n-pattern conflict check.

2. The method of claim 1, comprising removing from the circuit graph a second set of vertices selected from the plurality of vertices, wherein each of the vertices in the second set of vertices has less than n edge connections.

3. The method of claim 1, comprising recording each of the plurality of vertices and each of the plurality of edges prior to performing the at least one $K_{n+1}$ graph reduction.

4. The method of claim 1, wherein prior to performing at least one $K_{n+1}$ graph, the method comprises:
   identifying at least one $K_n$ graph within the circuit graph, wherein a $K_n$ graph comprises a second set of vertices selected from the plurality of vertices connected in series by a second set of edges selected from the plurality of edges and having at least one non-series edge connection between a first vertex and a second vertex selected from the second set of vertices, wherein the second set of vertices comprises n vertices; and
   merging a third vertex selected from the second set of vertices into a fourth vertex selected from the second set of vertices, wherein the third vertex has a vertex-specific set of edges selected from the second set of edges, and wherein the third vertex is merged into the fourth vertex by removing the third vertex from the circuit graph and adding the vertex-specific set of edges of the third vertex to the fourth vertex to generate the reduced circuit graph.

5. The method of claim 1, comprising checking the plurality of edges for one or more edges including at least one of a loop or an empty edge.

6. The method of claim 1, wherein the n-pattern conflict check is selected from the group consisting of: a brute-force n-color check, a heuristic n-pattern conflict check, and a deterministic rules-based conflict check.

7. The method of claim 1, wherein the Kn+1 graph reduction comprises a square loop reduction process.

8. The method of claim 1, comprising iteratively identifying one or more additional $K_{n+1}$ graphs and reducing the one or more additional $K_{n+1}$ graphs.

9. The method of claim 1, wherein n is equal to three, and wherein the at least one $K_{n+1}$ graph is a $K_4$ graph.

10. The method of claim 1, wherein n is equal to two, and wherein the at least one $K_{n+1}$ graph is a $K_3$ graph.

11. A method, comprising:
    receiving a circuit layout comprising a plurality of conductive lines;
    generating a circuit graph representative of the circuit layout, wherein the circuit graph comprises a plurality of vertices and a plurality of edges, wherein each of the plurality of vertices represents one of the plurality of conductive lines, and wherein each of the plurality of edges is representative of a spacing between the conductive lines less than an acceptable minimum distance;

coloring the circuit graph with n colors where n is equal to any integer greater than 3, and wherein each of the plurality of vertices is assigned one of the n colors based on an n-patterning checking process including at least one $K_{(n+1)}$ graph reduction;

assigning each of the plurality of conductive lines to one of n photomasks based on a color of a corresponding vertex from the plurality of vertices; and forming the n photomasks for use in a n-patterning photolithographic process.

12. The method of claim 11, wherein the $K_{(n+1)}$ graph reduction comprises removing a set of vertices selected from the plurality of vertices from the circuit graph, wherein each of the set of vertices has less than n edge connections.

13. The method of claim 11, wherein the n-pattern checking process comprises an n-pattern conflict check selected from the group consisting of: a brute-force n-color coloring, a heuristic n-pattern conflict check, and a deterministic rule-based conflict check.

14. The method of claim 11, where in the n-pattern checking process comprises at least one square loop reduction.

15. The method of claim 11, comprising iteratively identifying one or more additional $K_{n+1}$ graphs and reducing the one or more additional $K_{n+1}$ graphs.

16. The method of claim 11, wherein n is an integer greater than or equal to 3.

17. A system configured to generate a plurality of photomasks, the system comprising:

a computer configured to:

receive a circuit layout comprising a plurality of conductive lines;

generate a circuit graph representative of a circuit layout having a plurality of conductive lines, wherein the circuit graph comprises a plurality of vertices and a plurality of edges, wherein each of the plurality of vertices is representative of one of the plurality of conductive lines, and wherein each of the plurality of edges is representative of a spacing between the conductive lines less than an acceptable minimum distance;

reduce the circuit graph by one or more $K_{n+1}$ reductions to generate a reduced circuit graph; and check the reduced circuit graph for one or more triple patterning conflicts, wherein the checking assigns one of three colors to each of the set of vertices in the reduced circuit graph; and a photomask generator configured to generate a first photomask, a second photomask, and a third photomask each comprising a set of the plurality of conductive lines of the circuit layout, wherein each set of the plurality of conductive lines corresponds to one of three colors assigned to the set of vertices, wherein the first color corresponds to the first photomask, the second color corresponds to the second photomask, and the third color corresponds to the third photomask.

18. The system of claim 17, wherein the computer is configured to remove one or more vertices from the plurality of vertices, wherein the one or more vertices each have less than three edges associated therewith in the plurality of edges.

19. The system of claim 17, wherein the one or more $K_{n+1}$ reductions comprises merging a first vertex into a second vertex selected from a first set of the plurality of vertices defining a $K_n$ loop, wherein the first vertex has a set of edges selected from the plurality of edges, and wherein the first vertex is merged into the second vertex by removing the first vertex from the circuit graph and adding the set of edges to the second vertex to generate a reduced circuit graph.

20. The system of claim 19, wherein the first vertex and the second vertex have a largest path separation of pairs of vertices from the first set of the plurality of vertices.

* * * * *